(12) United States Patent
Rasmussen et al.

(10) Patent No.: US 8,639,482 B2
(45) Date of Patent: *Jan. 28, 2014

(54) METHODS AND SYSTEMS FOR MANAGING FACILITY POWER AND COOLING

(75) Inventors: Neil Rasmussen, Concord, MA (US); James W. VanGilder, Pepperell, MA (US); Scott Douglass Buell, Lake St. Louis, MO (US); Saurabh Kumar Shrivastava, Lowell, MA (US); Mikkel Dalgas, Sjoelund (DK)

(73) Assignee: Schneider Electric IT Corporation, West Kingston, RI (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/022,448

(22) Filed: Feb. 7, 2011

(65) Prior Publication Data

US 2011/0246147 A1 Oct. 6, 2011

Related U.S. Application Data

(63) Continuation of application No. 11/542,671, filed on Oct. 3, 2006, now Pat. No. 7,885,795, which is a continuation of application No. 11/342,285, filed on Jan. 27, 2006, now abandoned, which is a continuation-in-part of application No. 11/120,137, filed on May 2, 2005, now Pat. No. 7,596,476.

(60) Provisional application No. 60/719,356, filed on Sep. 22, 2005.

(51) Int. Cl.
*G06F 17/50* (2006.01)

(52) U.S. Cl.
USPC ............................................................ 703/5

(58) Field of Classification Search
USPC ............................................................ 703/5
See application file for complete search history.

(56) References Cited

U.S. PATENT DOCUMENTS

| 4,823,290 A | 4/1989 | Fasack et al. |
| 4,827,151 A | 5/1989 | Okado |
| 4,962,734 A | 10/1990 | Jorgensen |
| 5,462,225 A | 10/1995 | Massara et al. |
| 5,572,873 A | 11/1996 | Lavigne et al. |
| 5,581,478 A | 12/1996 | Cruse et al. |

(Continued)

FOREIGN PATENT DOCUMENTS

| CN | 1485906 A | 3/2004 |
| JP | 07269926 A | 10/1995 |

(Continued)

OTHER PUBLICATIONS

"Management Strategy for Network Critical Physical Infrastructure", White Paper #100, pp. 110, American Power Conversion, Dec. 15, 2003, published on World Wide Web.
Abdlmonem H. Beitelmal et al.: "Thermo-Fluids Provisioning of a High Performance High Density Data Center" Distributed and Parallel Databases, Kluwer Academic Publishers, BO, vol. 21, No. 2-3, Apr. 22, 2006, pp. 227-238, XP019499843, ISSN: 1573-7578.

(Continued)

*Primary Examiner* — Dwin M Craig

(57) ABSTRACT

Systems and methods are provided for determining data center cooling and power requirements and for monitoring performance of cooling and power systems in data centers. At least one aspect provides a system and method that enables a data center operator to determine available power and cooling at specific areas and enclosures in a data center to assist in locating new equipment in the data center.

21 Claims, 22 Drawing Sheets

(56) References Cited

U.S. PATENT DOCUMENTS

| | | | |
|---|---|---|---|
| 5,657,641 A | 8/1997 | Cunningham et al. |
| 5,682,949 A | 11/1997 | Ratcliffe et al. |
| 5,735,134 A | 4/1998 | Liu et al. |
| 5,850,539 A | 12/1998 | Cook et al. |
| 5,995,729 A | 11/1999 | Hirosawa et al. |
| 6,134,511 A | 10/2000 | Subbarao |
| 6,216,956 B1 | 4/2001 | Ehlers et al. |
| 6,246,969 B1 | 6/2001 | Sinclair et al. |
| 6,347,627 B1 | 2/2002 | Frankie et al. |
| 6,374,627 B1 | 4/2002 | Schumacher et al. |
| 6,459,579 B1 | 10/2002 | Farmer et al. |
| 6,574,104 B2 | 6/2003 | Patel et al. |
| 6,672,955 B2 | 1/2004 | Charron |
| 6,694,759 B1 | 2/2004 | Bash et al. |
| 6,714,977 B1 | 3/2004 | Fowler et al. |
| 6,718,277 B2 | 4/2004 | Sharma |
| 6,721,672 B2 | 4/2004 | Spitaels et al. |
| 6,745,579 B2 | 6/2004 | Spinazzola et al. |
| 6,795,928 B2 | 9/2004 | Bradley et al. |
| 6,804,616 B2 | 10/2004 | Bodas |
| 6,819,563 B1 | 11/2004 | Chu et al. |
| 6,859,366 B2 | 2/2005 | Fink |
| 6,862,179 B2 | 3/2005 | Beitelmal et al. |
| 6,881,142 B1 | 4/2005 | Nair |
| 6,886,353 B2 | 5/2005 | Patel et al. |
| 6,964,539 B2 | 11/2005 | Bradley et al. |
| 6,967,283 B2 | 11/2005 | Rasmussen et al. |
| 7,020,586 B2 | 3/2006 | Snevely |
| 7,031,870 B2 | 4/2006 | Sharma et al. |
| 7,051,946 B2 | 5/2006 | Bash et al. |
| 7,085,133 B2 | 8/2006 | Hall |
| 7,155,318 B2 | 12/2006 | Sharma et al. |
| 7,197,433 B2 | 3/2007 | Patel et al. |
| 7,251,547 B2 | 7/2007 | Bash et al. |
| 7,313,503 B2 | 12/2007 | Nakagawa et al. |
| 7,315,448 B1 | 1/2008 | Bash et al. |
| 7,403,391 B2 | 7/2008 | Germagian et al. |
| 7,426,453 B2 | 9/2008 | Patel et al. |
| 7,462,453 B2 | 12/2008 | Yamada et al. |
| 7,472,043 B1 | 12/2008 | Low et al. |
| 7,558,649 B1 | 7/2009 | Sharma et al. |
| 7,568,360 B1 | 8/2009 | Bash et al. |
| 7,596,476 B2 * | 9/2009 | Rasmussen et al. .............. 703/2 |
| 7,620,480 B2 | 11/2009 | Patel et al. |
| 7,676,280 B1 | 3/2010 | Bash et al. |
| 7,726,144 B2 | 6/2010 | Larson et al. |
| 7,881,910 B2 | 2/2011 | Rasmussen et al. |
| 7,885,795 B2 * | 2/2011 | Rasmussen et al. .............. 703/5 |
| 7,975,156 B2 | 7/2011 | Artman et al. |
| 7,979,250 B2 | 7/2011 | Archibald et al. |
| 7,991,592 B2 | 8/2011 | VanGilder et al. |
| 8,155,922 B2 | 4/2012 | Loucks |
| 8,219,362 B2 | 7/2012 | Shrivastava et al. |
| 8,249,825 B2 | 8/2012 | VanGilder et al. |
| 8,315,841 B2 | 11/2012 | Rasmussen et al. |
| 2001/0042616 A1 | 11/2001 | Baer |
| 2002/0059804 A1 | 5/2002 | Spinazzola et al. |
| 2002/0072868 A1 | 6/2002 | Bartone et al. |
| 2003/0115000 A1 | 6/2003 | Bodas |
| 2003/0115024 A1 | 6/2003 | Snevely |
| 2003/0147216 A1 | 8/2003 | Patel et al. |
| 2003/0158718 A1 | 8/2003 | Nakagawa et al. |
| 2003/0196126 A1 | 10/2003 | Fung |
| 2004/0020224 A1 | 2/2004 | Bash et al. |
| 2004/0065097 A1 | 4/2004 | Bash et al. |
| 2004/0065104 A1 | 4/2004 | Bash et al. |
| 2004/0075984 A1 | 4/2004 | Bash et al. |
| 2004/0083012 A1 | 4/2004 | Miller |
| 2004/0089009 A1 | 5/2004 | Bash et al. |
| 2004/0089011 A1 | 5/2004 | Patel et al. |
| 2004/0163001 A1 | 8/2004 | Bodas |
| 2004/0240514 A1 | 12/2004 | Bash et al. |
| 2004/0262409 A1 | 12/2004 | Crippen et al. |
| 2005/0016189 A1 | 1/2005 | Wacker |
| 2005/0023363 A1 | 2/2005 | Sharma et al. |
| 2005/0108582 A1 | 5/2005 | Fung |
| 2005/0225936 A1 | 10/2005 | Day |
| 2005/0228618 A1 | 10/2005 | Patel et al. |
| 2005/0267639 A1 | 12/2005 | Sharma et al. |
| 2006/0080001 A1 | 4/2006 | Bash et al. |
| 2006/0112286 A1 | 5/2006 | Whalley et al. |
| 2006/0115586 A1 | 6/2006 | Xing et al. |
| 2006/0121421 A1 | 6/2006 | Spitaels et al. |
| 2006/0139877 A1 | 6/2006 | Germagian et al. |
| 2006/0168975 A1 | 8/2006 | Malone et al. |
| 2006/0214014 A1 | 9/2006 | Bash et al. |
| 2007/0038414 A1 | 2/2007 | Rasmussen et al. |
| 2007/0076373 A1 | 4/2007 | Fink |
| 2007/0150215 A1 | 6/2007 | Spitaels et al. |
| 2007/0165377 A1 | 7/2007 | Rasmussen et al. |
| 2007/0174024 A1 | 7/2007 | Rasmussen et al. |
| 2007/0213000 A1 | 9/2007 | Day |
| 2007/0274035 A1 | 11/2007 | Fink et al. |
| 2008/0004837 A1 | 1/2008 | Zwinger et al. |
| 2008/0041076 A1 | 2/2008 | Tutunoglu et al. |
| 2008/0104985 A1 | 5/2008 | Carlsen |
| 2008/0105412 A1 | 5/2008 | Carlsen et al. |
| 2008/0174954 A1 | 7/2008 | VanGilder et al. |
| 2008/0245083 A1 | 10/2008 | Tutunoglu et al. |
| 2009/0030554 A1 | 1/2009 | Bean, Jr. et al. |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0205416 A1 | 8/2009 | Campbell et al. |
| 2009/0223234 A1 | 9/2009 | Campbell et al. |
| 2009/0259343 A1 | 10/2009 | Rasmussen et al. |
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0211669 A1 | 8/2010 | Dalgas et al. |
| 2010/0211810 A1 | 8/2010 | Zacho |
| 2010/0256959 A1 | 10/2010 | VanGilder et al. |
| 2010/0286956 A1 | 11/2010 | VanGilder et al. |
| 2010/0287018 A1 | 11/2010 | Shrivastava et al. |
| 2011/0040529 A1 | 2/2011 | Hamann et al. |

FOREIGN PATENT DOCUMENTS

| | | |
|---|---|---|
| WO | 03081406 A1 | 10/2003 |
| WO | 2006/034718 A1 | 4/2006 |
| WO | 2006119248 A2 | 11/2006 |
| WO | 2006124240 A2 | 11/2006 |
| WO | 2007095144 A2 | 8/2007 |
| WO | 2008144375 A2 | 11/2008 |
| WO | 2009/014893 A1 | 1/2009 |

OTHER PUBLICATIONS

Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.

APC User's Guide Brochure, "InfraStruXure Manager," Mar. 2004, 181 pgs.

ASHRAE, "Thermal Guidelines for Data Processing Environments" 2004, Atlanta: American Society of Heating, Refrigerating, and Air-Conditioning Engineers, Inc., 2004, Atlanta.

Bash, C. E. et al.: "Balance of Power: Dynamic Thermal Management for Internet Data Centers", IEEE Internet Computing, Jan. 1, 2005, pp. 42-49, vol. 9, No. 1, IEEE Service Center, New York, NY.

Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.

Chandrakant D. Patel, et al., "Thermal Considerations in Cooling Large Scale High Copute Density Data Centers" IEEE 2002, pp. 767-776.

Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.

Ehsan Pakabaznia et al., "Miminizing data center cooling and server power costs", Proceedings of the 14th ACM/IEEE International Sym-

(56) References Cited

OTHER PUBLICATIONS posium on Low Power Electronics and Design, ISPLED '09, Jan. 1, 2009, p. 145, XP55015368, New York, New York, USA, DOI: 101145/15942331594268, ISBN: 978-1-60-558684-7.

Herrlin, M.K., "Rack Cooling Effectiveness in Data Centers and Telecom Central Offices: The Rack Cooling Index (RCI)," ASHRAE Transaction, 2005, pp. 725-731, vol. 111(2).

Innovative Research, Inc., http://web.archive.org/web/20051221005029/http://www.inres.com/, Dec. 21, 2005, published on World Wide Web.

International Search Report and Written Opinion from corresponding International Application No. PCT/US2011/052561, dated Dec. 27, 2011.

International Search Report for PCT/US2006/16739 mailed Oct. 3, 2006.

International Search Report for PCT/US2008/051908 mailed Jul. 3, 2008.

International Search Report for PCT/US2009/065700 mailed Feb. 18, 2010.

International Search Report for PCT/US2010/023142, mailed May 11, 2010.

International Search Report for PCT/US2010/033867 mailed Jul. 7, 2010.

International Search Report for PCT/US2010/033876 mailed Jul. 1, 2010.

International Search Report for PCT/US2011/051866 mailed Feb. 24, 2012.

Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007, pp. 193-225, XP019499845, ISSN: 1573-7578, DOI:10.1007/S10619-006-7007-3.

K. Dunlap, "Cooling Audit for Identifying Potential Cooling Problems in Data Centers", White Paper #40, pp. 1-18, American Power Conversion, May 20, 2004, published on World Wide Web.

N. Rasmussen, "Calculating Total Cooling Requirements for Data Centers", White Paper #25, pp. 1-8, American Power Conversion, May 20, 2004, published on World Wide Web.

N. Rasmussen, "Cooling Strategies for Ultra-High Density Racks and Blade Servers", White Paper #46, pp. 1-22, American Power Conversion, Mar. 29, 2005, published on World Wide Web.

N. Rasmussen, "Strategies for Deploying Blade Servers in Existing Data Centers", White Paper #125, pp. 1-14, American Power Conversion, Mar. 29, 2005, published on World Wide Web.

Neil Rasmussen, "Air Distribution Architecture Options for Mission Critical Facilities," White Paper #55, Revision 1, 2003 American Power Conversion, Rev 2003-0, pp. 1-13.

Neil Rasmussen, "Avoidable Mistakes that Compromise Cooling Performance in Data Centers and Network Rooms," White Paper #49, 2003 American Power Conversion, Rev 2003-0, pp. 1-15.

Neil Rasmussen, "Cooling Options for Rack Equipment with Side-to-Side Airflow," White Paper #50, 2004 American Power Conversion, Rev 2004-0, pp. 1-14.

Sharma, R.K, Bash, C.E, and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Vangilder et al., "Airflow Uniformity thourhg Perforated Tiles in a Raised-Floor Data Center", White Paper 121, Jul. 17-22, 2005, 10 pages.

Vangilder, James W. et al., "Capture index: an airflow-based rack cooling performance metric," 2007, ASHRAE Transactions, vol. 113, pp. 126-136.

Vangilder, James W. et al., "Real-Time prediction of rack-cooling performance," 2006, ASHRAE Transactions, vol. 112, pp. 151-162.

"Enthalpy" Published by the National Aeronautics and Space Administration and edited by Tom Benson. Retrieved on Jul. 13, 2009 from http://www.grc.nasa.gov/WWW/K-12/airplane/enthalpy. html, pp. 3.

"Essential Cooling System Requirements for Next Generation Data Centers," White Paper #5, Revision 3, 2003 American Power Conversion, Rev 2002-3, pp. 1-10.

"How and Why Mission-Critical Cooling Systems Differ From Common Air Conditions," White Paper #56, Revision 2, 2003 American Power Conversion, Rev 2003-2, pp. 1-13.

Beitelmal et al., "Thermo-Fluids Provisioning of a High Performance High Density Data Center", Apr. 22, 2006, Springer Science and Business Media, Inc, Distributed and Parallel Databases, 21, pp. 227 -238 DO1:1 0.1 007/s10619-005-0413-0.

Le et al., "Operating Behaviour of Single Split Coil Systems Under Modulating and Two-Position Control", Published 2005 by American Society of Heating, Refrigerating and Air-Conditioning Engineers, Inc.

Neil Rasmussen, "Guidelines for Specification of Data Center Power Density," White Paper #120, 2005 American Power Conversion, Rev 2005-0, pp. 1-21.

Tony Evans, "Fundamental Principles of Air Conditioners for Information Technology," White Paper #57, Revision 1, 2004 American Power Conversion, Rev 2004-1, pp. 1-9.

Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010, pp. 1-8, XP031702357.

Karki et al., "Techniques for controlling airflow distribution in raised-floor data centers," ASME 2003.

"Case Study, Application of TileFlow to Improve Cooling in a Data Center," Innovative Research, Inc., 2004.

Pakbaznia, E.; Ghasemazar, M.; Pedream, M.; "Temperature-aware dynamic reseource provisioning in a power-optimized datacenter," Design, Automation & Test in Europe Conference & Exhibition (DATE), 2010, Vol., No., pp. 124-129, Mar. 8-12, 2010.

Marwah, M.; Sharma, R.; Shih, R.; Patel, C.; Bhatia, V.; Mekanapurath, M.; Velumani, R.; Velayudhan, S., 2009, Data analysis, visualization and knowledge discovery in sustainable data centers, in Proceedings of the 2nd Bangalore Annual Compute Conference (COMPUTE '09).

Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008, pp. 1129-1142, ISSN: 0018-9340, DOI: 10.1109/TC.2008.52.

Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009, pp. 785-791.

Refai-Ahmed G. et al., "Analysis of flow distribution in power supply using flow network modeling (FNM)", Thermal and Thermomechanical Phenomena in Electronic Systems, 2000, IT Herm 2000, The Seventh Intersociety Conference on May 23-26, 2000, Piscataway, NJ, USA, IEEE, Piscataway, NJ, USA, vol. 1, May 23, 2000, pp. 90-98, ISBN: 978-0-7803-5912-3.

Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, Vol. 13: New Del, vol. 13, Jan. 1, 2009, pp. 41-50, DOI: 10.1115/IMECE2009-10806, ISBN: 978-0-7918-4386-4.

Vangilder, James, W., et al., "Real-time prediction of rack-cooling performance," 2006, ASHRAE Transactions, vol. 112, pp. 151-162.

Vangilder, James, W., et al., "Capture index: an airflow-based rack cooling performance metric," 2007, ASHRAE Transactions, vol. 113, pp. 126-136.

\* cited by examiner

METHODS AND SYSTEMS FOR MANAGING FACILITY POWER AND COOLING

RELATED APPLICATIONS

The present application is a continuation of U.S. patent application Ser. No. 11/542,671 filed on Oct. 3, 2006, entitled METHODS AND SYSTEMS FOR MANAGING FACILITY POWER AND COOLING, which issued as U.S. Pat. No. 7,885,795 on Feb. 8, 2011, which is a continuation of U.S. patent application Ser. No. 11/342,285 filed on Jan. 27, 2006, now abandoned entitled METHODS AND SYSTEMS FOR MANAGING FACILITY POWER AND COOLING, which is a continuation-in-part of U.S. patent application Ser. No 11/120,137 filed May 2, 2005, entitled METHODS AND SYSTEMS FOR MANAGING FACILITY POWER AND COOLING which issued as U.S. Pat. No. 7,596,476 on Sep. 9, 2009. U.S. patent application Ser. No. 11/342,285 filed on Jan. 27, 2006, claims priority under 35 U.S.C. §119(e) to U.S. Provisional Application Ser. No. 60/719,356, filed Sep. 22, 2005, entitled METHODS AND SYSTEMS FOR MANAGING FACILITY POWER AND COOLING. U.S. patent application Ser. Nos. 11/542,671, 11/342,285, 11/120,137 and 60/719,356 are hereby incorporated herein by reference in their entireties.

BACKGROUND OF INVENTION

1. Field of Invention

Embodiments of the invention relate generally to method and systems for managing facility power and cooling.

2. Discussion of Related Data

Centralized data centers for computer, communications and other electronic equipment have been in use for a number of years, and more recently with the increasing use of the Internet, large scale data centers that provide hosting services for Internet Service Providers (ISPs), Application Service Providers (ASPSs) and Internet content providers are becoming more prevalent. Typical centralized data centers contain numerous racks of equipment that require power, cooling and connections to external communications facilities. In modern data centers and network rooms, the increased density of computing equipment used in these facilities has put strains on the cooling and power systems of the facilities. In the past, typical power consumption for each equipment enclosure in a data facility was on the order of 1 kW. With the use of server blades and other high power density equipment in equipment racks, it is not uncommon for an equipment rack to have a power draw of 10 kW or even as high as 25 kW.

Typically, the power consumed by computer equipment is converted to heat and typically, the cooling requirements of a facility are determined based on the power requirements of the facility. Typical data centers utilize air plenums under raised floors to distribute cooling air through a data center. One or more computer room air conditioners (CRACs) or computer room air handlers (CRAHs) are typically distributed along the periphery of the data room, and these units draw return air from the room or a ceiling plenum and distribute cooling air beneath the raised floor. Perforated tiles may be placed in front or beneath racks of equipment to be cooled to allow the cooling air from beneath the floor to cool equipment within the racks.

Several tools are available to assist a data center designer in configuring a layout of a data center to provide necessary power and cooling to equipment to be located in the data center. These tools typically assist a designer in determining total power requirements and accordingly overall cooling requirements for a data center. In addition, these tools may assist a designer in determining optimum equipment layout and proper sizing of power cabling and circuit breakers.

While existing tools provide a designer with detailed layout information regarding power distribution, these tools typically provide far less help in determining cooling needs for a facility. Advanced programs that use computational fluid dynamics (CFD) may be used to model the cooling design of a facility, but the use of such programs is extremely limited due to the complexity of the programs, which results in their use being prohibitively expensive and time consuming. U.S. Patent Application US2003/0158718 A1 to Nakagawa et al describes an automated system for designing a cooling system for a facility. In the system of Nakagawa, the facility is divided into a number of pre-characterized cells (such as a cluster of racks) over which the response of various parameters, such as maximum temperature, are known based on key parameters. The system uses built-in cell to cell interaction rules to predict overall thermal performance and to optimize equipment layout. While this system may offer some improvements in speed over a full CFD analysis, it is limited to the use of pre-characterized cells, and does not provide analysis below the cell level. Also, the cells must be characterized using, for example, a CFD analysis or physical testing.

Programs and systems such as those described above provide idealized results for the cooling performance of a facility and often fail to account for situations which often occur in real life installations, which can dramatically affect the cooling performance of a data center. For example, in a facility using a raised floor, the absence of one or more floor panels, or the misplacement of one or more perforated floor panels can greatly affect the cooling performance of the data center and cause the actual performance to vary greatly from a calculated idealized performance. Further, the degradation in performance of one or more air conditioning units can drastically change airflow and cooling characteristics of a facility.

The inability to properly analyze the cooling performance of a facility typically causes a data center designer to over design the facility from a cooling perspective, which results in the facility to be more expensive and less efficient.

In existing data centers, it is often desirable to replace equipment with upgraded equipment and/or add new equipment to existing enclosures in the facility. Several tools exist which enable a manager of a data center to monitor power usage in a facility. These tools include the InfraStruxure™ Manager product available from American Power Conversion Corporation of West Kingston, R.I.

With the increasing cooling and power requirements of computer equipment, it is desirable for a data center manager to determine if there is adequate power and cooling available in the facility before new or replacement equipment may be added. Typically, a data center manager may know, or can determine, if the total cooling capacity of the data center is sufficient for the total power draw. However, hot spots in a facility may develop, particularly where high power density equipment is used, and it may not be enough to merely analyze cooling capacity at the facility level. To attempt to identify hot spots, a data center manager may resort to manual temperature measurements throughout a facility and try to implement fixes to correct the hot spots. Such fixes may involve a rearrangement or replacement of perforated floor panels, a rearrangement of enclosures, and/or adding additional cooling capacity. In any case, these fixes are typically done on a trial and error basis, and while some hot spots may be eliminated, the fixes may cause other hot spots to arise due to a redirection of the cooling air in the facility. This trial and error approach can lead to unexpected failures of equipment, which is unacceptable in critical data centers. To avoid such failures, data center managers typically over design facilities and fail to use facilities to their full capacity.

SUMMARY OF INVENTION

Embodiments of the invention provide systems and methods for determining data center cooling and power requirements and for monitoring performance of cooling and power systems in data centers. At least one embodiment provides a system and method that enables a data center operator to determine available power and cooling at specific areas and enclosures in a data center to assist in locating new equipment in the data center.

A first aspect is directed to a method that includes determining cooling capacity of a number of equipment enclosures in a data center, determining cooling requirements of each of the number of equipment enclosures, and providing an indication of remaining cooling capacity for each of the number of equipment enclosures.

The method may further include developing a floor plan model of the data center, wherein the floor plan model includes a floor plan that indicates location of each of the number of equipment enclosures in the data center, and for each of the number of equipment enclosures, displaying on the floor plan, the indication of remaining cooling capacity. The indication of remaining cooling capacity may include an indication of additional power that can be drawn by each of the number of equipment enclosures based on the remaining cooling capacity. Determining cooling capacity may include calculating a predicted cooling capacity based on the floor plan model. Determining cooling capacity may include measuring airflow at a first plurality of locations in the facility to obtain a measured cooling capacity. Determining cooling capacity may include measuring air temperature at a second plurality of locations in the facility. At least one of the first plurality of locations and the second plurality of locations includes at least one air vent of a raised floor. The method may further include comparing predicted cooling capacity with measured cooling capacity to obtain a comparison result and providing an indication when the comparison result is greater than a threshold. The method may further include adjusting the predicted cooling capacity based on measured airflow. The method may further include determining placement of new equipment in an equipment enclosure in the data center by comparing power ratings of the new equipment with cooling capacity of the equipment enclosure. The method may further include, for each of the number of equipment enclosures, determining electrical power capacity and remaining electrical power availability, and displaying on the floor plan remaining electrical power availability. In the method, determining remaining electrical power availability may include measuring at least one parameter of electrical power provided to at least one of the number of equipment enclosures. In the method, determining cooling capacity of an equipment enclosure may include estimating available cooling air at the equipment enclosure using a weighted summation of available airflows from a plurality of airflow sources, the weights used in the weighted summation may decrease with distance from the equipment enclosure to each of the airflow sources, and the weights may be based on mechanical characteristics of the plurality of airflow sources. The method may further include determining available airflow of at least one of the plurality of airflow devices using at least one of specifications of the at least one of the plurality of airflow devices and measured data for the at least one of the plurality of airflow devices in the data center. The method may further include determining available airflow of at least a second one of the plurality of airflow devices based on the measured data for the at least one of the plurality of airflow devices. In the method, determining cooling capacity may include using superposition to combine airflows. In the method, determining airflow into and out of each of a plurality of sides of each control volume may include computing airflows using equations based on at least one of conservation of mass and conservation of momentum. Further, determining airflow into and out of each of a plurality of sides of each control volume may include determining airflows using empirical rules derived from CFD, physical measurement, or any other means.

A second aspect of the invention is directed to a system for managing a data center. The system includes at least one input to receive data related to equipment and equipment enclosures and to receive data related to cooling characteristics of the data center, a controller operatively coupled to the input and configured to determine cooling capacity of each equipment enclosure, and at least one output operatively coupled to the controller that provides an indication of remaining cooling capacity for each of the equipment enclosures.

The system may further include an output device coupled to the at least one output, wherein the system is configured to display a floor plan of at least a portion of the data center indicating location of at least one of the equipment enclosures in the data center and indicating the remaining cooling capacity for the at least one of the equipment enclosures. The output device may be configured to include an indication of additional power that can be drawn by the at least one of the equipment enclosures. The system may further include at least one airflow monitor operatively coupled to the controller to provide data related to at least one airflow in the data center. The system may further include at least one air monitor operatively coupled to the controller to provide data related to air temperature at a location in the data center. The controller may be configured to compare a predicted cooling capacity with a measured cooling capacity to obtain a comparison result and to provide an indication when the comparison result is greater than a threshold. The system may further include at least one power monitor operatively coupled to the controller, and at least one airflow controller operatively coupled to the controller and responsive to signals from the controller to alter cooling airflow in the data center. The system may further include at least one power controller operatively coupled to the controller and responsive to signals from the controller to alter at least one characteristic of power in the data center.

A third aspect of the invention is directed to a system for managing a data center. The system includes at least one input to receive data related to equipment and equipment enclosures and to receive data related to cooling characteristics of the data center, and means, coupled to the at least one input, for determining remaining cooling capacity for each of the number of equipment enclosures and providing an indication of remaining cooling capacity.

The system may further include means for providing an indication of additional power that can be drawn by each of the equipment enclosures and means for updating the indication of remaining cooling capacity based on measured airflows in the data center. The system may still further include means for determining placement of equipment in the data center based on remaining cooling capacity, and means for estimating available cooling air of at least one of the equipment enclosures using a weighted summation of available airflows from a plurality of airflow sources.

Another aspect of the invention is directed to a computer-implemented method of managing power and cooling capacity of a data center. The method includes receiving data center parameters, determining an equipment layout in the data center, the equipment layout identifying a location of each of a plurality of devices in the data center, based on the location, determining available power and available cooling in the data center for each of the plurality of devices, comparing the available power and available cooling with power requirements and cooling requirements of each of the plurality of devices to obtain a cooling comparison result and a power comparison result for each of the plurality of devices.

The method may further include comparing each of the comparison cooling results and the power cooling results with thresholds and providing at least one recommendation for correcting an out of tolerance condition. The at least one recommendation may include adding an in-row cooling unit in a row of equipment of the data center along with a proposed location for the in-row cooling unit. The method may further include determining at least one of stranded cooling capacity and stranded power capacity in the data center and providing recommendations for reducing at least one of the stranded power capacity and the stranded cooling capacity in the data center. The method may further include displaying a floor plan model of the data center, wherein the floor plan model includes a floor plan that indicates a location of each of the plurality of devices in the data center, and for each of the plurality of devices, displaying on the floor plan an indication of remaining cooling capacity. The method may include displaying on the floor plan an indication of remaining power capacity for each of the plurality of devices. The method may still further include setting a redundancy level for at least some of the plurality of devices, and wherein the available power and available cooling are determined to meet the redundancy level. In the method, the act of determining the equipment layout may include arranging the plurality of devices in at least two substantially parallel rows with a hot aisle formed between the two rows, and the method may further include conducting a cooling analysis by analyzing airflows in the hot aisle. The method may include selecting at least one in-row cooling unit to be placed in the layout in one of the at least two substantially parallel rows. At least one of the plurality of devices is an equipment rack, and the method may include determining a capture index for the at least one in-row cooling unit and the equipment rack. The method may further include on a display screen, simultaneously displaying a first floor plan model of the data center and a second floor plan model of the data center, wherein the first floor plan model includes at least a partial view of the data center and the second floor plan model includes a full view of the data center. The second floor plan model may include an indication of a portion of the data center that is shown in the first floor plan model. The method may further include displaying a three dimensional view of at least a portion of the data center. The method may include selecting a camera location for use in the data center and displaying a three dimensional view of a viewing area of the camera. The method may further include selecting a subset of the plurality of devices and defining a power zone for each device of the subset of the plurality of devices, wherein each power zone includes at least one UPS. In the method, each of the plurality of devices may be an equipment rack, and the method may further include selecting components for each of the plurality of devices from a displayed list of components. The method may further include determining operational power costs and operational cooling costs for a subset of the plurality of devices, and the operational power costs and operational cooling costs may be determined in terms of kilowatts. The method may further include transferring an electronic file containing data for the equipment layout from a design system to a management system. The method may also include displaying measured data for the data center on a display of a layout of the data center.

Another aspect of the invention is directed to a computer-implemented method for designing a layout of a data center. The method includes receiving information from a user regarding parameters of the data center, determining an equipment layout for the data center, the equipment layout identifying a location of each of a plurality of devices in the data center, and on a display screen, simultaneously displaying a first floor plan model of the data center and a second floor plan model of the data center, wherein the first floor plan model include at least a partial view of the data center and the second floor plan model includes a full view of the data center.

In the method, the second floor plan model may include an indication of a portion of the data center that is shown in the first floor plan model. The method may further include determining available power and available cooling in the data center for each of the plurality of devices, and comparing the available power and available cooling with power requirements and cooling requirements of each of the plurality of devices to obtain a cooling comparison result and a power comparison result for each of the plurality of devices. The method may include, for each of the plurality of devices, displaying on the first floor plan model an indication of remaining cooling capacity, and displaying on the first floor plan model an indication of remaining power capacity for each of the plurality of devices.

Another aspect of the invention is directed to a system for use with a data center. The system includes an input to receive instructions from a user, an output to provide output data to a display device, and a controller coupled to the input and to the output and configured to determine an equipment layout of a data center, the equipment layout identifying a location of each of a plurality of devices in the data center. The controller is further configured to, based on the location, determine available power and available cooling in the data center for each of the plurality of devices, and compare the available power and available cooling with power requirements and cooling requirements of each of the plurality of devices to obtain a cooling comparison result and a power comparison result for each of the plurality of devices.

In the system, the controller may be configured to compare each of the comparison cooling results and the power cooling results with thresholds, and based on at least one of the cooling comparison result and the power comparison result, provide at least one recommendation for correcting an out of tolerance condition. The at least one recommendation may include adding an in-row cooling unit in a row of equipment of the data center, and the at least one recommendation may include a proposed location for the in-row cooling unit. The controller may be configured to determine at least one of stranded cooling capacity and stranded power capacity in the data center, and to provide recommendations for reducing at least one of the stranded power capacity and the stranded cooling capacity in the data center. The controller may be further configured to provide data to the output for displaying a floor plan model of the data center, wherein the floor plan model includes a floor plan that indicates a location of each of the plurality of devices in the data center, and provide data to the output for displaying on the floor plan an indication of remaining cooling capacity. The controller may be further configured to provide data to the output for displaying on the floor plan an indication of remaining power capacity for each of the plurality of devices, and the controller may be configured to determine the available power and available cooling based on a user-selected redundancy level. The controller may be configured to arrange the plurality of devices in at least two substantially parallel rows with a hot aisle formed between the two rows, and to conduct a cooling analysis by analyzing airflows in the hot aisle. The controller may be configured to select at least one in-row cooling unit to be placed in the layout in one of the at least two substantially parallel rows. At least one of the plurality of devices may be an equipment rack, and the controller may be configured to determine a capture index for the at least one in-row cooling unit and the equipment rack. The controller may be configured to provide data to the output to simultaneously display a first floor plan model of the data center and a second floor plan model of the data center, wherein the first floor plan model includes at least a partial view of the data center and the second floor plan model includes a full view of the data center. The second floor plan model may also include an indication of a portion of the data center that is shown in the first floor plan model. The controller may be configured to provide data to the output to display a three dimensional view of at least a portion of the data center, and to provide data to the output to display a three dimensional view of a viewing area of a camera to be located in the data center. The controller may be further configured to select a subset of the plurality of devices and define a power zone for each device of the subset of the plurality of devices, wherein each power zone includes at least one UPS. The system may further include a database module containing data for components to be loaded into the plurality of devices, and the controller may be configured to provide data to the output for displaying a list of the components. The controller may be configured to determine operational power costs and operational cooling costs for a subset of the plurality of devices, and the operational power costs and operational cooling costs may be determined in terms of kilowatts. The controller may also be configured to provide an output electronic file containing data for the equipment layout. The controller may also be configured to, based on at least one of the cooling comparison result and the power comparison result, provide at least one recommendation for placement of rack mount equipment.

Another aspect of the invention is directed to a computer-implemented method for designing a layout of a data center. The method includes receiving information from a user regarding parameters of the data center, determining an equipment layout for the data center, the equipment layout identifying a location of each of a plurality of devices in the data center, including identifying a row location for each of a plurality of equipment racks with a first subset of the plurality of equipment racks being included in a first row; and on a display screen, displaying a rack view of the data center showing a front view of each of the plurality of equipment racks of the first subset in the first row.

In the method, displaying a rack view may include displaying a front view of a second subset of the plurality of equipment racks of a second row along with the front view of the first subset of the plurality of equipment racks. In the method, displaying a rack view may include displaying a front view of a second subset of the plurality of equipment racks of a second row along with the front view of the first subset of the plurality of equipment racks. The first row may include additional equipment, with the additional equipment not included in the rack view. The method may further include simultaneously displaying on the display screen the rack view and a full room view of the equipment layout for the data center. The method may also include, in response to selection of a selected equipment rack in the full room view by a user, displaying the selected equipment rack in the rack view, and displaying the selected equipment rack in the rack view may include displaying a front view of the selected equipment rack.

Another aspect of the invention is directed to a computer-implemented method for evaluating the cooling performance of a cluster of equipment racks in a data center, wherein the cluster of equipment racks includes at least a first row of racks and a second row of racks separated by a cool aisle, with each of the equipment racks being configured to draw cooling air from the cool aisle. The method includes obtaining at least one of power data and airflow data for each of the equipment racks, obtaining cool airflow data for cool air supplied to the cool aisle from a source of cool air, and conducting an analysis of airflows in the cool aisle to determine a recirculation index for at least one of the equipment racks, wherein the recirculation index is indicative of a quantity of recirculated air included in an input airflow of the at least one equipment rack.

In the method, the recirculation index may be equal to a ratio of recirculated air to total air in the input airflow of the at least one equipment rack, and the method may further include determining a recirculation index for each of the equipment racks. In the method, the act of obtaining cool airflow data may include obtaining cool airflow data for an in-row cooling unit included in the cluster of racks. In the method, the act of obtaining cool airflow data may include obtaining cool airflow data of at least one perforated tile included in the cool aisle. In the method, the act of conducting an analysis may include defining a plurality of control volumes in the cool aisle, and the method may further include determining airflows in the cool aisle by determining airflow into and out of at least one of the control volumes. The method may further include comparing the recirculation index for each of the plurality of equipment enclosures with a threshold. The method may further include determining a cooling capacity for each of the equipment enclosures based on the recirculation index for each of the equipment enclosures, and displaying the cooling capacity for each of the equipment enclosures along with a representation of a data center containing the cluster. In the method, the act of conducting an analysis may include assigning different chemical concentration identifiers to the airflows for at least two of the plurality of equipment racks. In the method, the act of conducting an analysis may include importing empirical data and determining end of aisle airflows using the empirical data. In the method, the act of conducting an analysis may include determining cool aisle airflows in isolation from the data center to obtain isolated results, and combining the isolated results with the empirical data.

Another aspect of the invention is directed to a computer-implemented method for evaluating the cooling performance of a cluster of equipment racks in a data center, wherein the cluster of equipment racks includes at least a first row of racks and a second row of racks separated by a hot aisle, with each of the equipment racks being configured to exhaust air into the hot aisle. The method includes obtaining at least one of power data and airflow data for each of the equipment racks, obtaining airflow data for at least one air removal unit contained in one of the first row of equipment racks and the second row of equipment racks, and conducting an analysis of airflows in the hot aisle to determine a capture index for at least one of the equipment racks, wherein the capture index is indicative of a fraction of air that is exhausted by the at least one of the equipment racks and captured by the at least one air removal unit.

In the method, the at least one air removal unit may include an in-row cooling unit, and the capture index may be equal to a ratio of captured air to total air exhausted by the at least one equipment rack. The method may further include determining a capture index for each of the equipment racks. In the method, the act of conducting an analysis may include defining a plurality of control volumes in the hot aisle, and the method may further include determining airflows in the hot aisle by determining airflow into and out of at least one of the control volumes. The method may further include comparing the capture index for each of the plurality of equipment enclosures with a threshold. The method may include determining a cooling capacity for each of the equipment enclosures based on the capture index for each of the equipment enclosures, and displaying the cooling capacity for each of the equipment enclosures along with a representation of a data center containing the cluster. In the method, the act of conducting an analysis may include assigning different chemical concentration identifiers to the airflows for at least two of the plurality of equipment racks. In the method, the act of conducting an analysis may include importing empirical data and determining end of aisle airflows using the empirical data. The act of conducting an analysis may include determining hot aisle airflows in isolation from the data center to obtain isolated results, and combining the isolated results with the empirical data. In the method, the act of conducting an analysis may include importing empirical rules, and determining the capture index using the empirical rules, and the empirical rules may include coefficients for use in determining at least one capture index.

Another aspect of the invention is directed to a computer-readable medium encoded with instructions for execution on a computer system. The instructions, when executed, perform a method comprising acts of obtaining at least one of power data and airflow data for a plurality of equipment racks arranged in a cluster, wherein the cluster of equipment racks includes at least a first row of racks and a second row of racks separated by a cool aisle, with each of the equipment racks being configured to draw cooling air from the cool aisle, obtaining cool airflow data for cool air supplied to the cool aisle from a source of cool air, and conducting an analysis of airflows in the cool aisle to determine a recirculation index for at least one of the equipment racks, wherein the recirculation index is indicative of a quantity of recirculated air included in an input airflow of the at least one equipment rack.

The recirculation index may equal to a ratio of recirculated air to total air in the input airflow of the at least one equipment rack, and the acts may further include determining a recirculation index for each of the equipment racks. The act of obtaining cool airflow data may include obtaining cool airflow data for an in-row cooling unit included in the cluster of racks. The act of obtaining cool airflow data may include obtaining cool airflow data of at least one perforated tile included in the cool aisle. The act of conducting an analysis ma include defining a plurality of control volumes in the cool aisle, and wherein the method further includes determining airflows in the cool aisle by determining airflow into and out of at least one of the control volumes. The acts may further include comparing the recirculation index for each of the plurality of equipment enclosures with a threshold, and determining a cooling capacity for each of the equipment enclosures based on the recirculation index for each of the equipment enclosures. The acts may further include displaying the cooling capacity for each of the equipment enclosures along with a representation of a data center containing the cluster. The act of conducting an analysis may include assigning different chemical concentration identifiers to the airflows for at least two of the plurality of equipment racks. The act of conducting an analysis may include importing empirical data and determining end of aisle airflows using the empirical data. The act of conducting an analysis may include determining cool aisle airflows in isolation from the data center to obtain isolated results, and combining the isolated results with the empirical data.

Another aspect of the invention is directed to a computer-readable medium encoded with instructions for execution on a computer system. The instructions when executed, perform a method comprising acts of obtaining at least one of power data and airflow data for a plurality of equipment racks arranged in a cluster, wherein the cluster of equipment racks includes at least a first row of racks and a second row of racks separated by a hot aisle, with each of the equipment racks being configured to exhaust air into the hot aisle, obtaining airflow data for at least one air removal unit contained in one of the first row of equipment racks and the second row of equipment racks, and conducting an analysis of airflows in the hot aisle to determine a capture index for at least one of the equipment racks, wherein the capture index is indicative of a fraction of air that is exhausted by the at least one of the equipment racks and captured by the at least one air removal unit.

In the method, the at least one air removal unit may be an in-row cooling unit, and the capture index may be equal to a ratio of captured air to total air exhausted by the at least one equipment rack. The acts may further include determining a capture index for each of the equipment racks. The act of conducting an analysis may include defining a plurality of control volumes, and wherein the method further includes determining airflows in the hot aisle by determining airflow into and out of at least one of the control volumes. The acts may further include comparing the capture index for each of the plurality of equipment enclosures with a threshold. The acts may further include determining a cooling capacity for each of the equipment enclosures based on the capture index for each of the equipment enclosures, and displaying the cooling capacity for each of the equipment enclosures along with a representation of a data center containing the cluster. The act of conducting an analysis may include assigning different chemical concentration identifiers to the airflows for at least two of the plurality of equipment racks. The act of conducting an analysis may include importing empirical data and determining end of aisle airflows using the empirical data. The act of conducting an analysis may include determining hot aisle airflows in isolation from the data center to obtain isolated results, and combining the isolated results with the empirical data. The act of conducting an analysis may include importing empirical rules, and determining the capture index using the empirical rules. The empirical rules include coefficients for use in determining at least one capture index.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
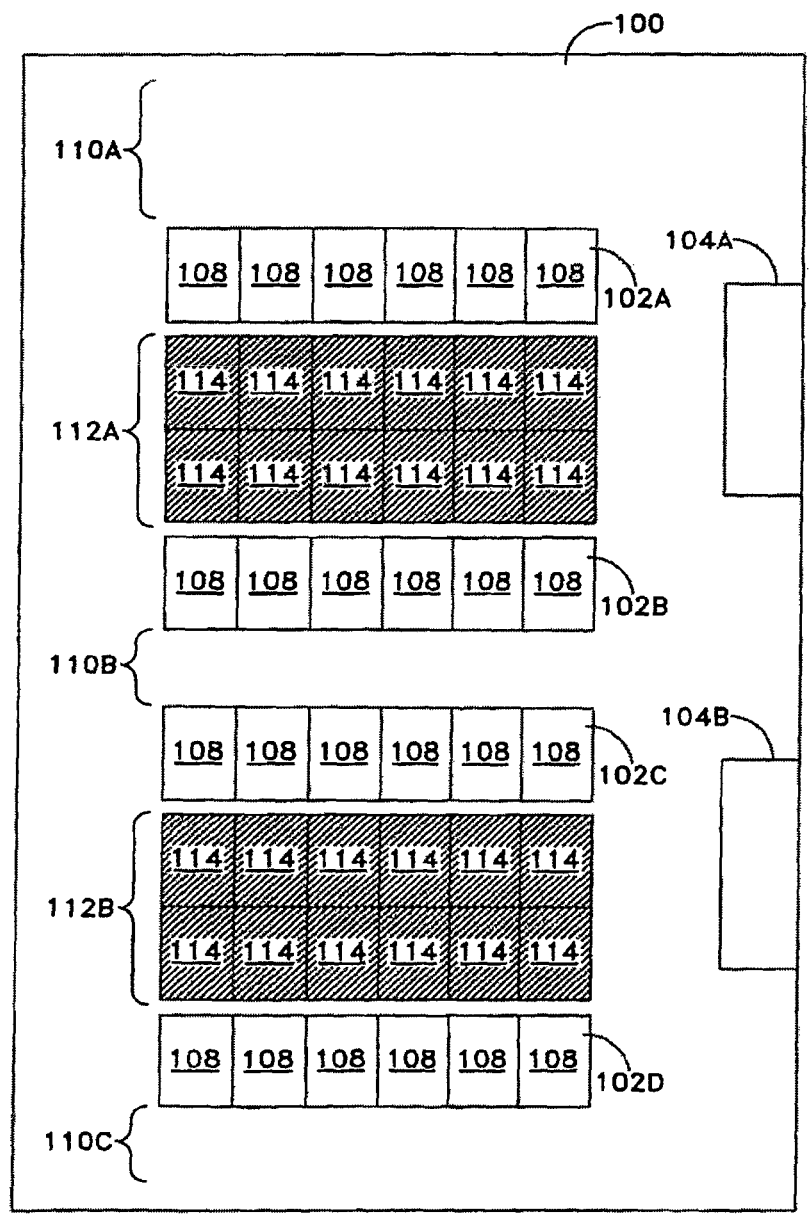
FIG. 1 is a top view of a data center of the type with which embodiments of the present invention may be used.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 2:
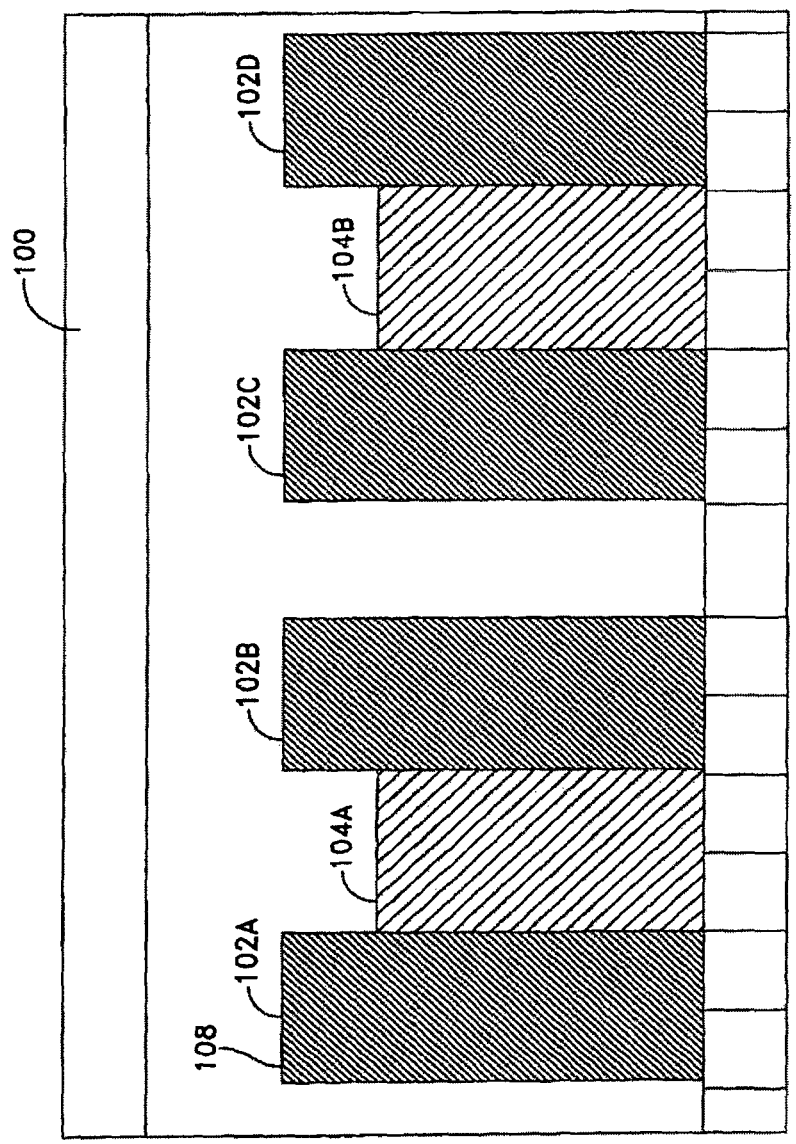
FIG. 2 is a side view of the data center of FIG. 1.

Embodiments of the present invention may be used to design, manage and retrofit a data center, such as data center 100 which is shown in FIGS. 1 and 2 with FIG. 1 showing a top view of the data center 100, and FIG. 2 showing a side view of the data center 100. As discussed further below, the design of the layout of the data center 100, including power and cooling considerations may be performed using systems and processes of embodiments of the present invention. Embodiments of the invention, however, are not limited for use with data centers like that shown in FIGS. 1 and 2 and may be used with other facilities that do not include raised floors and may be used with facilities that house equipment other than computing equipment, including telecommunications facilities and other facilities. Further, embodiments of the invention may be used with raised floor and equipment layouts that are not neatly arranged in the manner shown in FIGS. 1 and 2. Embodiments of the present invention may use systems, devices and methods described in U.S. patent application Ser. No. 10/038,106, filed Jan. 2, 2002, titled "Rack Power System and Method," incorporated herein in its entirety by reference.

The data center 100 includes rows of racks 102A, 102B, 102C and 102D, cooling units 104A and 104B, and a raised floor 106. Each of the rows includes racks 108, at least a number of which draw cool air from the front of the rack and return warm air to the rear or top or rear and top of the rack. As understood by those skilled in the art, to optimize cooling performance in a data center, rows of racks are often positioned to create alternating cold aisles and hot aisles. In the configuration shown in FIGS. 1 and 2, aisles 110A, 110B and 110C are hot aisles and aisles 112A and 112B are cold aisles. To provide cooling to the racks, in front of each of the racks in the cold aisle, perforated floor tiles 114 are used to provide cooling air from under the raised floor. In the data center 100, in addition to the perforated floor tiles shown, the raised floor may include solid floor tiles. The cooling units 104A and 104B are designed to provide cool air to the area under the raised floor and to receive return warm air from the space adjacent the ceiling of the data center. In other embodiments, in addition to or in place of the cooling units 104A and 104B, in-row cooling units, such as those available from American Power Conversion Corporation, may be used. Further, in at least one embodiment, half-rack in-row cooling units may be used, as described in co-pending U.S. patent application Ser. No. 11/335,901 entitled COOLING SYSTEM AND METHOD, by Neil Rasmussen et al., filed on Jan. 19, 2006, and incorporated herein by reference. As described in the referenced application, the half-rack, in-row units have a width of twelve inches, which is approximately half of that of a standard data center rack.

Figure 3:
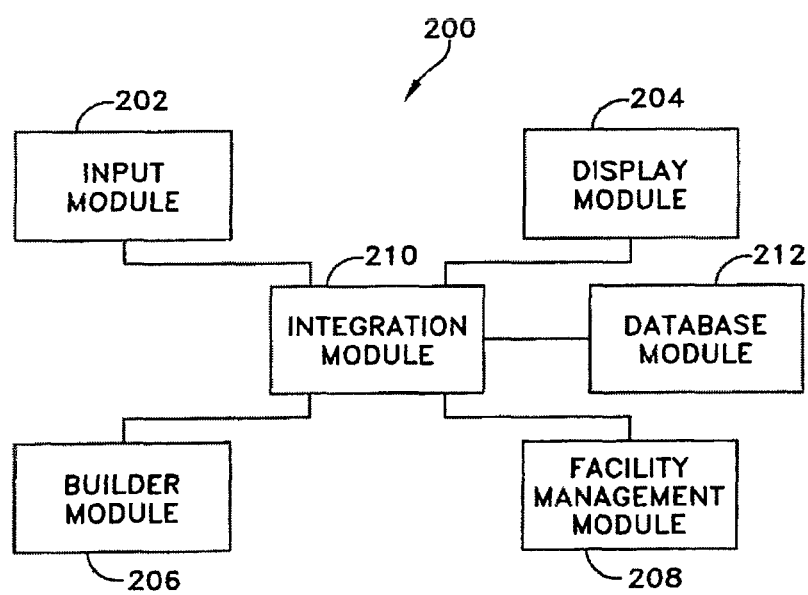
FIG. 3 is a functional block diagram of a system in accordance with one embodiment of the present invention.

One embodiment of the invention, directed to a system and a method for designing, monitoring, and upgrading the equipment installed in a data center, such as data center 100, will now be described with reference to FIG. 3. FIG. 3 shows a functional block diagram of a design and management system 200. Embodiments of the invention are not limited to the functions provided by the functional blocks or the particular arrangement of the blocks. In addition, the functions provided by the system 200 need not be implemented on one computer system, but rather may be implemented using a number of networked devices as described further below that provide the functions described. Further, particular embodiments may have more or less functions and functional modules than those described below with reference to FIG. 3. In different embodiments, the functions described with reference to FIG. 3 may be performed on one processor or controller or may be distributed across a number of different devices.

The system 200 includes an input module 202, a display module 204, a builder module 206, a facility management module 208, an integration module 210, and a database module 212. The input module 202 provides an interface to allow users to enter data into the system 200. The input module may include, for example, one of a number of known user input devices for computer systems, and in addition, in at least one embodiment, electronic data regarding a facility and/or equipment to be loaded into a facility may be entered into the system through a network interface or using an electronic media storage reader.

The display module includes a display interface and may include a graphical display to display output data to a user. In addition, the display module may include an interface for one or more printers that provide a hard copy of output data.

The builder module 206 includes routines for designing optimal layout of equipment in a facility, determining power requirements and cooling requirements for electronic enclosures, ensuring that the placement of equipment, cooling units and power distribution branches in the facility allow the power and cooling requirements to be met, and calculating for each electronic enclosure the remaining power capacity and cooling capacity available based on the layout of equipment in the facility.

The facility management module 208 is used by the system 200 after equipment is installed in the facility. The management module includes routines to monitor power and cooling characteristics of equipment in a facility. The management module may be coupled, either directly or through one or more networks, to measurement devices and control devices throughout the facility.

The integration module 210 is the main module in the system and coordinates flow of data in the system to perform methods of embodiments of the present invention.

The database module is used to store data regarding various devices that may be used in a data center, such as servers, uninterruptible power supplies, air conditioning units, racks and any other equipment. The data stored may include physical parameters (i.e., dimensions) as well as power and cooling consumption data, and in the case of power supplies and air conditioning units may include cooling and power output characteristics. As described below, the database module may be used in embodiments of the invention to provide a complete bill of materials (BOM) for a completed design. In one embodiment, a centralized web-accessible database server may be used to store equipment information and warnings and error messages, allowing easy access to the information for editing.

A flow chart of a method 300 in accordance with one embodiment that may be performed using the system 200 will now be described with reference to FIG. 4. Initially, at stage 302 of the method 300, information regarding the facility is loaded into the system. The information includes, for example, dimensions of the facility, locations of doors, support columns, parameters of available power, cooling capabilities of the facility, whether a raised floor or drop ceiling is in use, and characteristics of any such floor and roof.

In stage 304 of the method, information regarding equipment to be installed in the facility is entered. The information includes, for example, the number of racks of equipment, maximum power draw for each of the racks, dimensions of the racks, and cooling requirements for the racks. The need for backup power sources and multiple power sources for equipment and or racks may also be entered at stage 304. In one embodiment, characteristics of individual pieces of equipment that are to be loaded into racks may also be entered. Also, the weight of equipment (including equipment loaded into racks) may be used to ensure that the weight of the installed equipment is within any facility constraints. These characteristics may include, in addition to power and cooling requirements, the amount of rack space that the equipment needs to occupy. In one embodiment, the database module 212 contains information regarding a number of devices, such as uninterruptible power supplies, equipment racks, cooling units, generator systems, electrical routing devices, including cables, and servers and other computer equipment. In this embodiment, when a particular model number of a device is entered, characteristics of the device are retrieved from the database module. Equipment related to fire protection and security may also be included in the design. Further, in at least one version, all equipment and components within equipment racks may include RFID tags, which can be used by systems of the invention to track location of equipment and racks.

Once all of the information is entered into the system, at stage 306, the system in one embodiment determines a layout for the equipment in the facility, taking into account the power and cooling requirements of the equipment as well as other characteristics of the equipment that were entered at stage 304 or retrieved from the database module. In another embodiment, the user may create the layout graphically, adding racks and other equipment where desired, and in this embodiment, the system will provide feedback during the layout process, disallowing some choices and making intelligent suggestions. These rules may include, for example: a standard alternating hot aisle/cold aisle layout must be specified, the plenum must be greater than some minimum value, the total room cooling capacity must exceed total room cooling load, aisles must be wide enough for access purposes and to meet building codes, distance between PDU and IT racks served by the PDU must not exceed some maximum value, PDU must be located immediately adjacent to a UPS, where a cable ladder spans an aisle, the aisle cannot exceed a maximum width, etc.

Next, at stage 308, a cooling analysis is conducted to determine if the design provides adequate cooling for each of the racks and the equipment installed in the racks. As described further below, in different embodiments of the present invention one of a number of different methods may be used to conduct the cooling analysis. In one embodiment, if the results of the cooling analysis indicate that one or more devices and/or racks are not receiving adequate cool air, then the procedure may return to stage 306 to change the layout of the equipment based on feedback provided from the analysis conducted at stage 308.

At the completion of the cooling analysis, at stage 310, a room model is displayed showing the locations of the equipment in the facility. The room model may include, for each equipment rack, information regarding the total power and cooling being consumed as well as an indication of total available power and cooling to the rack. In one embodiment actual power and cooling data may be displayed, while in other embodiments colors may be used, either alone or in combination with data, to display different levels of power and cooling availability. For example, if a rack is operating with sufficient cooling air with a margin above a threshold, the rack may be indicated in green on the display, if the cooling air availability is closer to the threshold, the rack may be indicated in yellow, and if the rack does not have sufficient cooling air it may be indicated in red. Still further, the results of the analysis may indicate that adequate power and/or cooling is being provided for equipment, but that specified redundancy levels are not being met, either at the room level, a row level, or at a specific equipment rack. Specific details regarding the room model is described further below with reference to FIGS. 5 and 5A to 5D.

At decision block 312, a determination may be made by, for example, a facility designer as to whether the layout generated in stage 310 is satisfactory. The determination may be based on additional criteria of importance to the designer that was not included during the design of the original layout. For example, it may be desirable to have certain racks near each other or to have certain racks isolated from one another. At stage 314, additional criteria or other feedback can be provided and the process then returns to stages 306 and 308 where the room model can be refined. Stages 306 to 312 may be repeated until a satisfactory model is achieved at stage 312. In at least one embodiment, at the completion of the design stage, a bill of materials is generated and may be used to provide the cost of the equipment to be installed in the facility and may also be used to generate a sales order for the equipment, providing a simple solution for ordering all equipment associated with a new data center. Further, CAD drawings and electronic files that capture the designed layout may also be generated.

At stage 316, the equipment is installed in the facility according to the layout generated at stages 306 to 314. In one embodiment, measurement equipment to measure cooling characteristics and power characteristics may be installed with the equipment. The measurement equipment is described further below, and may include, for example, devices for measuring power, airflow and temperature at various locations in the facility and within equipment racks located in the facility.

At stage 318 of the process 300, power and cooling parameters are measured using the measurement equipment. Additional temperature measurements may also be provided by devices, such as servers, that have the capability to detect internal temperatures. The parameters measured may be used continuously by the management module of the system 200 to detect error conditions and to monitor trends that may lead to an error condition. Further, in the process 300, the measured parameters can be compared with predicted parameters calculated during the design process in stages 306 and 308. For example, in one embodiment, the airflow through a perforated floor tile of a raised floor is used to determine the available cooling air of a rack located adjacent the floor tile. The airflow through the perforated tile may be determined in stage 308 using one of a number of computational methods that are described further below, or the airflow may be determined using data from related physical measurements or simulations. Once the equipment is installed in the facility, the perforated floor tile may be instrumented to measure the actual airflow through the tile. The actual measured value may then be compared with the calculated value at stage 320. If the two differ by more than a predetermined threshold, then an indication or warning may be provided and the calculations conducted in stage 308 may be conducted once again at stage 322 using measured values in place of calculated values as appropriate to obtain updated parameters.

After stage 322, the model of the facility described above with reference to stage 310 may be displayed with values of power and cooling availability and consumption updated to reflect any differences between measured parameters and calculated parameters. Any out of tolerance conditions (for either cooling or power) may be indicated on the display using, for example, a color coded scheme as described above. In one embodiment, a user may be provided with a number of available options to correct an out of tolerance condition. The options may include upgrading or adding facility equipment (i.e., an air conditioning unit or an uninterruptible power supply) or may include moving equipment and/or racks. Stages 318 to 322 of the process may be performed continuously as part of a management system of the data facility.

In one embodiment of the invention, stages 302 to 314 of the process 300 are implemented using a build-out system accessible by a user over the Internet. In this embodiment, the user provides the requested information, and the build-out system provides the processing described above, provides outputs to the user over the Internet, and stores results locally. After the equipment has been installed in the facility, the management system 500 (described below) may access the build-out system to download information related to the equipment. In addition, when a retrofit of the facility is to occur, the management system may contact the build-out system to coordinate the design of the retrofit. In at least one embodiment, electronic files may be imported/exported between the systems to provide a complete transfer of all information related to a data center's design.

Figure 5:
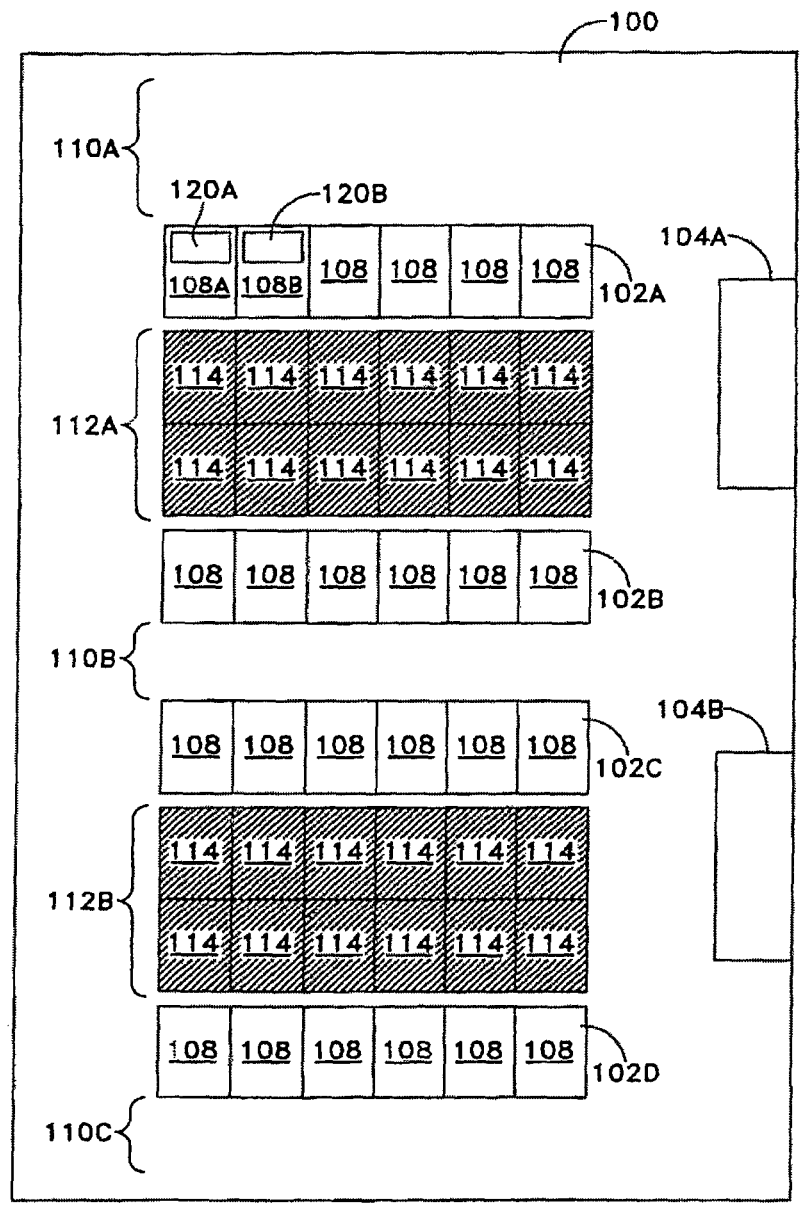
FIG. 5 is a diagram showing facility information that can be displayed using at least one embodiment of the invention.

FIG. 5 shows an example of a display of a room model that may be generated using the system 200 and the process 300 and shown on a computer display. The room model shown in FIG. 5 is essentially the data center 100 previously discussed above with reference to FIGS. 1 and 2, however, in FIG. 5, additional data related to the power and cooling consumption and capacity of each rack may be included in an informational block, such as informational blocks 120A and 120B shown on two of the racks 108A and 108B in FIG. 5. Informational blocks may be included on each rack, or on less than all racks, for example, by row, zone, or cluster.

Figure 5A:
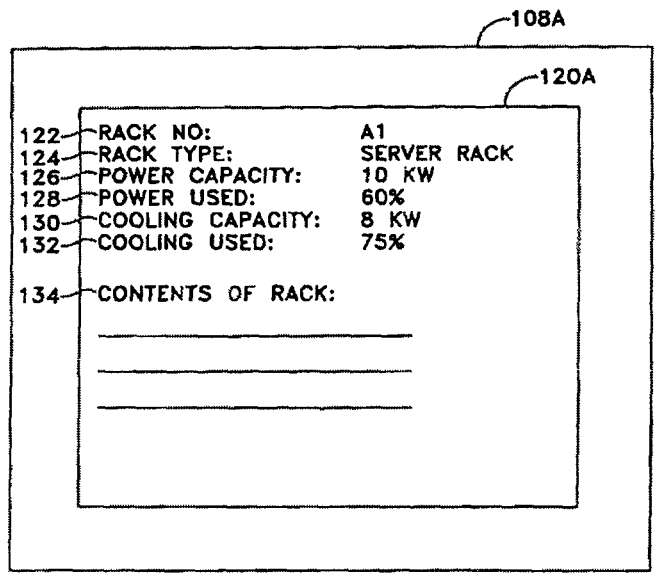
FIGS. 5A and 5B are diagrams showing additional information that can be displayed using embodiments of the invention.
Figure 5B:
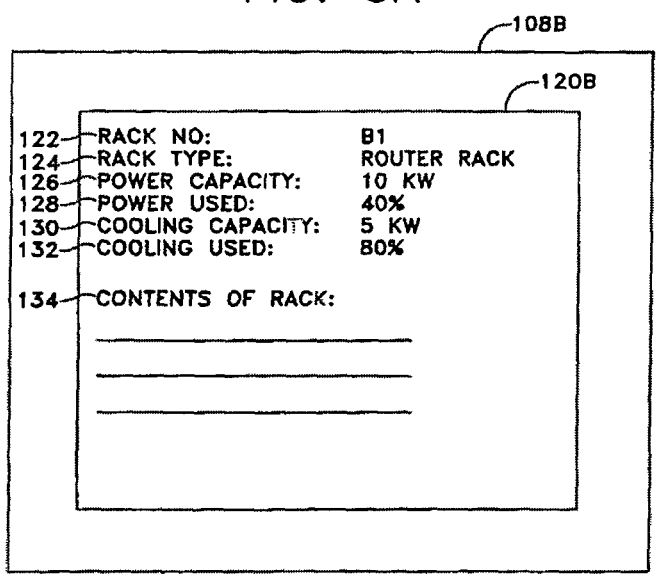

FIGS. 5A and 5B show enlarged views of respectively racks 108A and 108B that may also be shown on a computer display of systems of embodiments of the invention. In the views of FIGS. 5A and 5B, specific information regarding the racks is included in the informational block. In the embodiment shown, the information in the block includes a rack identifier 122, a rack type 124, power capacity 126, power usage 128, cooling capacity 130, cooling usage 132 and contents of the rack 134. In other embodiments, information for each rack may be included in tabular form on a graphical display showing the room layout.

The rack identifier 122 includes a row number and a rack number, however, in other embodiments, the rack identifier may also include an indicator of the type of rack, membership of the rack to a particular row, zone or cluster, manufacturer of the rack, as well as other information. The rack type 124 identifies the particular type of rack, i.e., server rack, router rack or telecommunications rack. The power capacity 126 indicates the maximum power capacity of the rack, and the power usage indicator 128 indicates the percentage of maximum capacity at which the rack is expected to operate. In different embodiments, the power usage indicator may be calculated based on manufacturer supplied data for equipment contained in the rack and/or based on actual power measurements of equipment. The power capacity for a rack, in at least one embodiment, is determined based on limitations of devices and/or power cables that supply power to the rack, such as circuit breakers, UPS's or any other devices. The contents of the rack 134 includes a list of the equipment contained in the rack and may include an indication of remaining space in the rack displayed, for example, in terms of rack units, which are typically referred to as "U" with 1 U equal to 1.75 inches. Details regarding the equipment in the rack, including operational status and network addresses, such as an IP address for a device may also be included.

The cooling capacity indicator 130 and cooling usage indicator 132 identify respectively the quantity of cooling air available to the rack and the percentage of that cooling air that is being used by equipment in the rack. In other embodiments power and cooling usage may be indicated using various types of graphical gauges, such as a bar graph, that indicates power and cooling usage and capacity. In the embodiment shown in FIGS. 5A and 5B, the cooling capacity is shown in terms of kilowatts (kW). As known to those skilled in the art, for typical data center applications, many equipment racks typically require approximately 160 cfm (cubic feet per minute) of cooling air per kilowatt of power used by the rack. All the power consumed by computing type devices is typically converted to heat, such that the required cooling (in terms of kW) for a rack can be assumed to be equal to the power consumption of the rack. Accordingly, in one embodiment, the cooling usage indicator is equal to the power consumed by the rack. In other embodiments, depending on the type of equipment that is installed in the racks, the cooling required by a rack may not be equal to that consumed by the rack and may be calculated based on manufacturer's data for the equipment, based on test results, or in any other manner.

The cooling capacity of an equipment rack is determined based on a number of different factors. For example, for a raised-floor environment, these factors may include: location of the rack in the facility, proximity of perforated tiles to the rack, the amount and temperature of cooling air provided through any such perforated tile, the physical or geometric layout of the racks and building, and the cooling requirements of other equipment in the facility located near the rack. The cooling capacity of one rack in a facility may be affected by the cooling usage of nearby racks, and accordingly, in one embodiment, the cooling capacity of a rack is adjusted when the cooling usage of a nearby rack is changed. In at least one embodiment of the present invention, calculations for determining cooling capacity of a rack are based in part on the ability of one rack to borrow cooling air available to adjacent racks. Particular methods for determining cooling capacity for racks in embodiments of the present invention are described further below. In one embodiment, when the cooling usage of one rack is changed, the cooling capacity of that rack, and all racks located near the changed rack is recalculated.

In embodiments of the present invention, during the design as well as during the management of a datacenter, the true available capacity of a data center can be determined at the rack level, at the row level and at the room level. In determining available capacity (including unused capacity), both cooling and power capacity are used, and the true available capacity can be determined using the lower of the power and the cooling capacity. In situations where the power capacity is not equal to the cooling capacity, then the excess power capacity or cooling capacity can be considered wasted or stranded capacity that can not be used in the present design. In embodiments of the present invention, the stranded capacity can be determined at the rack level and can be totaled to determine stranded capacity at the row level and at the room level. Recommendations are provided for reducing stranded capacity during the design phase as well as during the management phase. The recommendations may include reducing capacity of power and cooling (thereby reducing operational costs) or adding cooling capacity or power capacity appropriately to reduce the stranded capacity. Warnings may be generated when the stranded capacity is greater than preset thresholds, and in addition, recommendations for more optimal locations of equipment, including power and cooling equipment, may also be provided to minimize the amount of stranded capacity. Further, costs of the stranded capacity may be calculated.

In management systems and methods of embodiments of the invention, as described above, power and cooling capacity and availability may be monitored in real time. In one version, changes to the availability rate (or the utilization rate) are monitored and based on these changes, the growth rate of a data center may be determined, and predictions of dates when additional capacity will be required can be provided. The ability to monitor capacity and predict future capacity needs allows data center operators to control costs and plan for upcoming expenses. Further, determinations may be made as to the additional expenses that will be incurred if new equipment is added. The total cost (for example per kilowatt) can also be determined during the design phase or during operation.

In embodiments of the invention described herein, data-center layouts may be designed to provide specific redundancy levels (i.e., n, n+1,or 2n) for both the power design and the cooling design. In data centers in the past, additional room cooling units are typically provided to include some redundancy in a datacenter, such that an overall cooling capacity of the datacenter can be maintained, even when one or more of the room cooling units fails or must be powered down to conduct maintenance. One problem with these past solutions is that the cooling redundancy is designed at the room level and not the rack level, and while overall cooling capacity may meet redundancy requirements, cooling at the rack level may not meet the desired redundancy requirements. In embodiments described herein, the ability to provide accurate airflow data at the rack level allows true cooling redundancy to be designed into a solution.

Figure 5C:
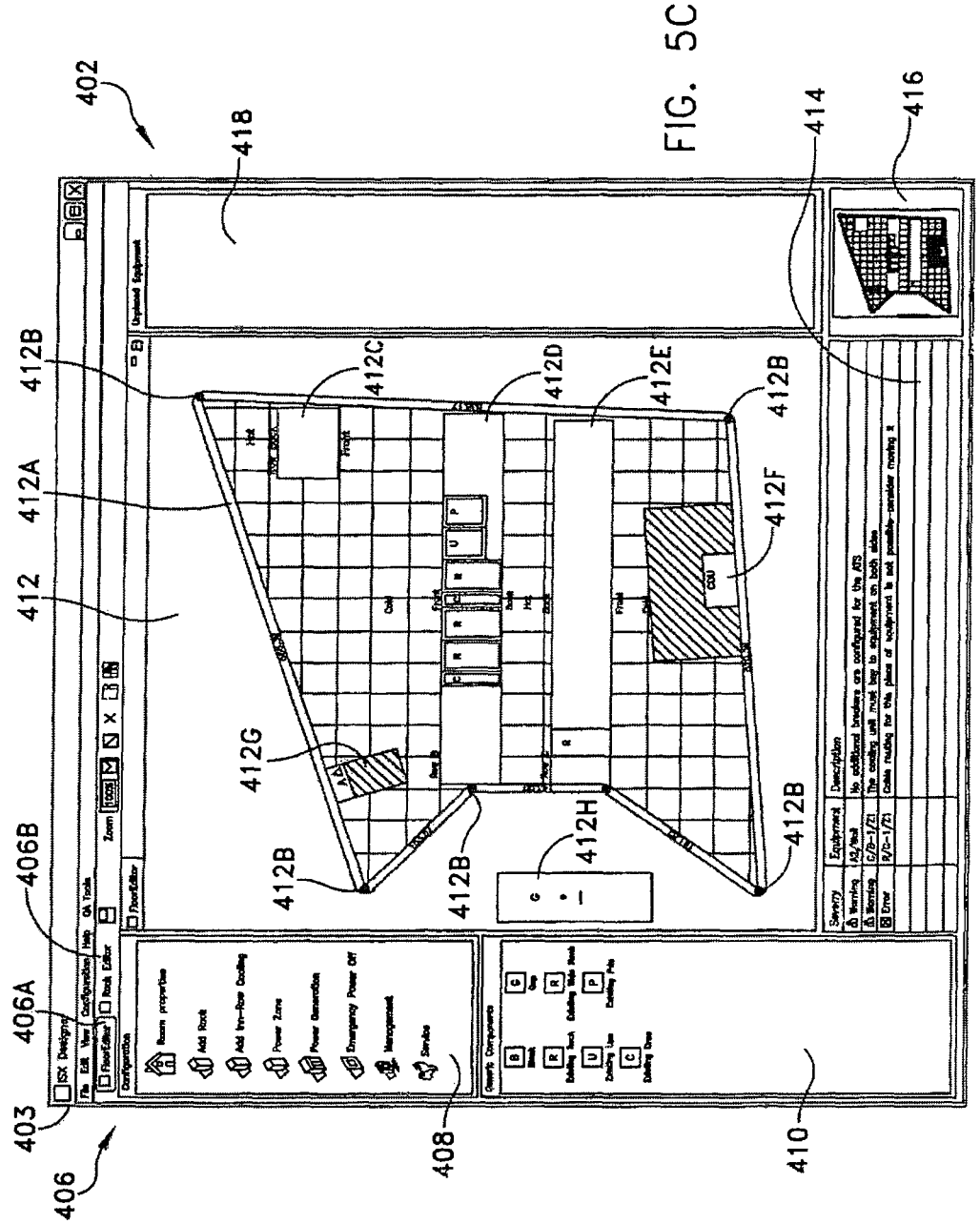
FIGS. 5C and 5D show graphical user interface screens that can be used in some embodiments of the present invention.
Figure 5D:
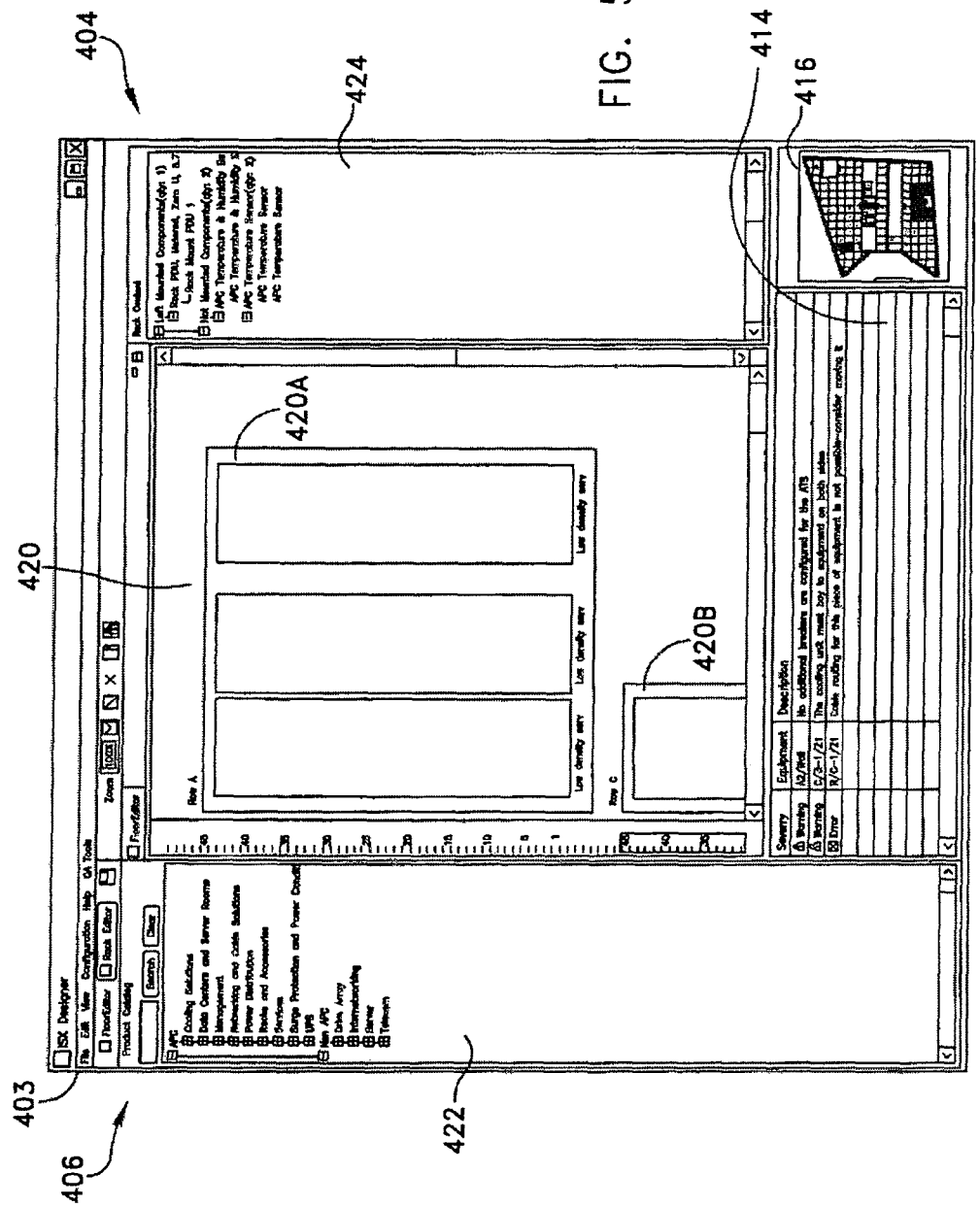

As discussed above, graphical user interfaces may be used with embodiments of the present invention to assist in the design and management of data centers. Particular user interface screens used in one embodiment to design a layout in a data center will now be described further with reference to FIGS. 5C and 5D. FIG. 5C shows a floor editor interface 402 used in one embodiment to layout equipment in a data center, while FIG. 5D shows a rack editor interface 404 used in one embodiment to provide further details of the contents of equipment in the data center. In one embodiment of a data center design system, tutorials are provided for a user to assist the user by providing best practice design guidelines. The tutorials may be accessed by a user as desired or may be configured to be displayed as a user is taking a particular action.

The floor editor interface includes a main menu 403, a tool bar 406, a configuration box 408, a generic components box 410, a floor layout box 412, a status box 414 a full-image viewing box 416, and an unplaced equipment box 418. The main menu 403 provides a drop-down menu in a format known to those skilled in the art, and allows a user to perform various functions, including the ability to "undo" and/or "redo" changes that are made to the layout. The tool bar 406 provides short hand access to functions of the design system, and in one embodiment includes a floor editor button 406A and a rack editor button 406B. Activation of the floor editor button results in the display of the screen shown in FIG. 5C, while activation of the rack editor button results in display of the screen shown in FIG. 5D.

The floor editor box 412 shows the layout of equipment in a data center being designed and provides text that identifies the equipment contained in the layout. A room perimeter 412A shows the exterior walls of the room along with dimensions of the room that can be set by a user. In one embodiment, when a new design is started, the user is presented with a screen showing a number of basic room configurations that can be selected. Further, the walls of the room can be moved by a user by selecting one of buttons 412B, and additional buttons can be added where needed to expand or shrink an area of the room. In one embodiment, the room size may be changed as equipment is added to the layout. Three rows 412C, 412D and 412E are outlined in the room shown in FIG. 5C. In other embodiments, more or less rows may be included. As shown in FIG. 5C, the rows are configured in a manner to provide alternating hot and cold aisles. Row 412D includes three equipment racks (identified by "R"), two half-rack cooling units (identified by "C") a UPS ("U") and a power distribution unit ("P"). Row 412E includes one rack, and row 412C as presently configured does not include any equipment. During the design phase additional equipment may be added to each of the rows. The room also includes an automatic transfer switch (ATS) 412G and a cooling distribution unit (CDU) 412F. Hatched areas are shown on the display around the ATS and CDU to indicate that these areas should be kept clear of equipment. Each piece of equipment in the room may include identifiers that indicate the type of rack as well as the rack's location in the room and the power source for the rack. Further, as discussed above, each rack may include information regarding power and cooling use and availability. Still further, text may be provided on each row to indicate total power and cooling information for each row.

The configuration box 408 includes eight configuration options for designing a data center. A room properties configuration option, when selected, allows a user to identify physical, power, and cooling values that affect the data center design as a whole including dimensions of the room, aisle widths and total anticipated power density for the data center. Power redundancy requirements (i.e. N, N+1, 2N), cooling redundancy requirements and runtime requirements for UPS systems may also be set. The number of data troughs that will be used and location of power distribution and cooling line distribution (i.e. overhead or under a raised floor) can also be configured. In one embodiment, only in-row cooling is provided, however, in other embodiments other types of cooling solutions may be used as well. In at least one embodiment, individual rows may be rotated to different angles in the data center. Further, while only one room is shown in FIG. 5C, at least one embodiment allows a data center to include multiple rooms.

An add rack configuration option in the configurations box 408 is used to add equipment racks to the data center design. When this option is selected, a user is presented with choices of various types of racks to add to the data center. When racks are selected, an indicator is provided in the unplaced equipment box 418, indicating that the racks still need to be placed into the room layout.

An add in-row cooling option in the configuration box is used to add in-row cooling units to the data center design. When this option is selected, a user is presented with various types of cooling units that can be added in the rows. As with equipment racks, when a cooling unit is selected, an indicator is provided in the unplaced equipment box 418, indicating that the cooling unit still needs to be placed in the room layout.

A power zone option in the configuration box is used to identify and select PDU's and UPS's and to indicate which equipment will be powered from the UPS's and PDU's. Characteristics of the PDU's and UPS's may also be selected. Once selected, an indicator is provided in the unplaced equipment box 418 for the UPS's and PDU's. In one embodiment, multiple racks may be included in a selection on the layout to identify the equipment that belongs to a particular power zone. In still another embodiment, after selection of equipment and UPS's and PDU's, an automatic power zone option may be implemented in which the system matches equipment power requirements (i.e., redundancy levels, voltages, phasing) to those of the UPS's and PDU's and assigns power zones automatically and determines lengths of power cables that are needed to power equipment from the assigned PDU. In automatically determining power zones, the system may also identify the need for additional UPS's and PDU's.

A power generation option in the configuration box 408 is used to identify and select an automatic transfer switch (ATS) and generator. Again, once these are selected, an indicator is provided in the unplaced equipment box 418.

An emergency power off option in the configuration box is used to select an emergency power off (EPO) solution for the data center design, and once selected, an indicator for the EPO solution will be added in the unplaced equipment box.

A management option in the configuration box 408 allows a data center manager, such as the InfraStruxure Manager discussed above, to be added. In one embodiment, when selecting the manager, a rack location for the manager is also selected.

A service option in the configuration box 408 allows a user to select a level of service to be provided to the data center by a data center services organization.

Other configuration options may include a row planning configurator that allows a user to plan how many racks a row can support by defining the power and cooling settings for the row, prior to placing equipment in a row. In one embodiment, the row planning configurator may provide an estimate on the number of racks that can be supported based on the power components and in-row cooling units contained in the row. In one embodiment, the row planning configurator may provide a complete layout based on design best practices.

The generic components box 410 includes a number of icons to designate pre-existing equipment in a data center. The components may be selected and "dragged" into position in the layout. In one embodiment, the generic components include blocks and gaps. The gaps can be used to identify areas over which cables and conduits can be routed (i.e. a walkway), while the blocks are used to identify areas over which cables and conduits can not be routed (i.e. a column). Once dragged onto the layout, the blocks and gaps can be sized appropriately.

As discussed above, when equipment is selected for use in the data center, an icon appears in the unplaced equipment box 418. To place the equipment in the layout, the icon is selected and dragged into the appropriate location in the layout. In one embodiment, when adding an in-row cooling unit, the icon for the cooling unit can be placed between two adjacent racks and released, and the racks will then move in the row to allow the cooling unit to be inserted between the racks. Further, in one embodiment, a snap-to feature is employed to align equipment properly in rows and along walls, and in addition, rows and equipment may be aligned along and "snapped to" floor tiles when, for example, a raised floor is in use. Using this feature, a user does not need to precisely align objects.

The full-image viewing box 416 provides a "bird's eye" view of the layout contained in the floor layout box 412. In one embodiment, the zoom button on the tool bar can be used to enlarge the view of the data center layout in the floor layout box 412. When the view is enlarged, the entire layout may not appear in the floor layout box. The full-image box 416 still displays the full image of the layout for the user. In one embodiment, when the full layout does not appear in the floor layout box, an overlay is used in the full-image box to indicate on the full-image, the portion of the layout that is displayed in the floor layout box. In one embodiment, when the full image is not displayed in the floor layout box 412, the overlay may be selected and dragged within the full-image viewing box to select which part of the layout is displayed in the floor layout box.

The status box 414 is used to display warnings, errors and other conditions to the user. The warnings may vary in severity and may include indications that design guidelines are being violated and may also include more severe warnings indicating that power and cooling capacities have been exceeded. In one embodiment, when the status box indicates that there is an error or warning associated with a particular piece of equipment in the layout, the piece of equipment may be highlighted with a color such as red or yellow. In at least one embodiment, when an error or warning occurs, guidelines for correcting the error or warning are provided by either selecting a highlighted piece of equipment or the error or warning message directly.

The rack editor interface 404 will now be described further with reference to FIG. 5D. The rack editor interface includes the tool bar 406, the status box 414 and the full-image viewing box 416 discussed above. Further, the rack editor interface 404 also includes a rack editor box, a product catalog box 422 and a rack content section 424.

The rack editor box 420 shows the front face of each of the equipment racks in the data center layout with the racks being arranged by row. In FIG. 5, two rows of racks 420A and 420B are shown. As shown in FIG. 5, in one embodiment, only the equipment racks are shown in the rack editor box. When a particular rack is selected in the rack editor box, then the contents of the rack appear in the rack content box 424, and components may be added to the selected rack. Racks may be selected in the rack editor box or may also be selected in the full-image view box 416. When a rack is selected in the full-image view box, then the image in the rack editor box will shift, if necessary, to provide a view that includes the selected rack.

The product catalog box 422 provides a comprehensive listing of components that may be used in equipment racks in data centers. The user may select equipment to be included in each rack, and as equipment is selected, it is included in the rack content box 424. The list may include only equipment of a particular manufacturer or may include equipment from several manufacturers. In one embodiment, all necessary hardware and cabling associated with rack equipment may be selected from the product catalog box.

In another embodiment, in addition to the graphical user interface screens shown above, a three-dimensional option is available allowing a user to view the design of a data center in 3D. In one embodiment, a design system includes software code programmed in Java that is used to generate 3D models that are rendered via OpenGL to allow for hardware acceleration. Further, 3D models may be exported from the design system to CAD tools such as AutoCAD, available from AutoDesk of San Rafael, Calif. As described above, security cameras can be implemented into datacenters designed using embodiments of the present invention. In one version that has 3D viewing capabilities, security cameras may be included in the design and the 3D view may be used to view a simulation of a camera's view after installation. In one embodiment, networked cameras and other security monitoring devices available from Netbotz Corporation of Austin, Tex. may be used.

Figure 4:
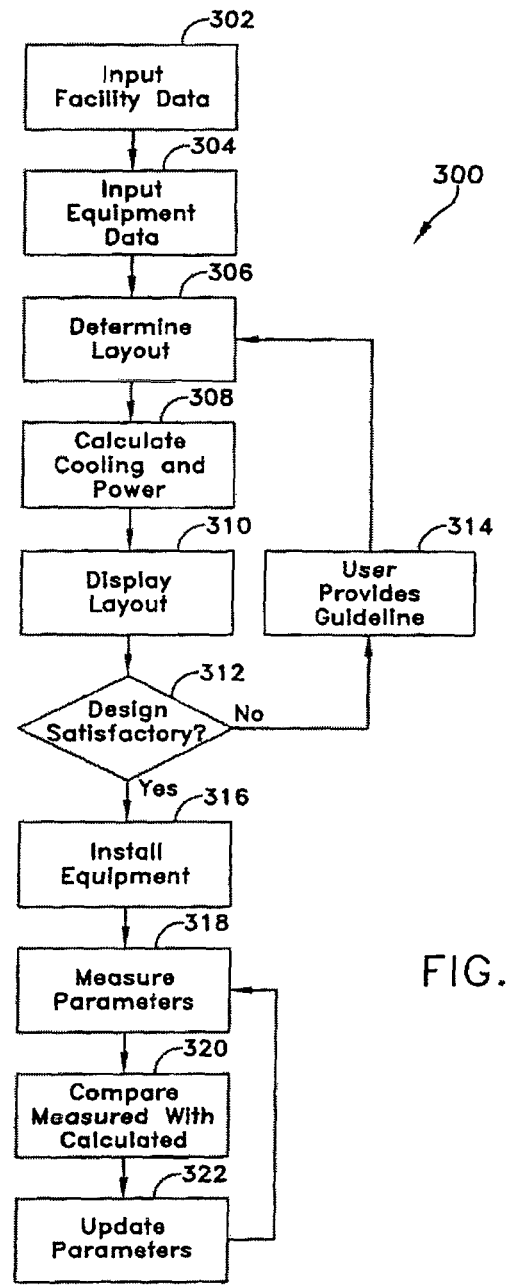
FIG. 4 is a flowchart of a process that may be implemented using the system of FIG. 3 in accordance with one embodiment of the invention.

As discussed above, with reference to the process shown in FIG. 4, the system 200, and other systems of the present invention, may be used as part of a data center management system. The management system may include the system 200 described above with the management module containing routines to perform management functions, or in other embodiments, the management functions may be performed by a designated manager controller contained in the data center and implemented, for example, in a computer server located in one of the racks of equipment and accessible by a user using a management console.

Figure 6:
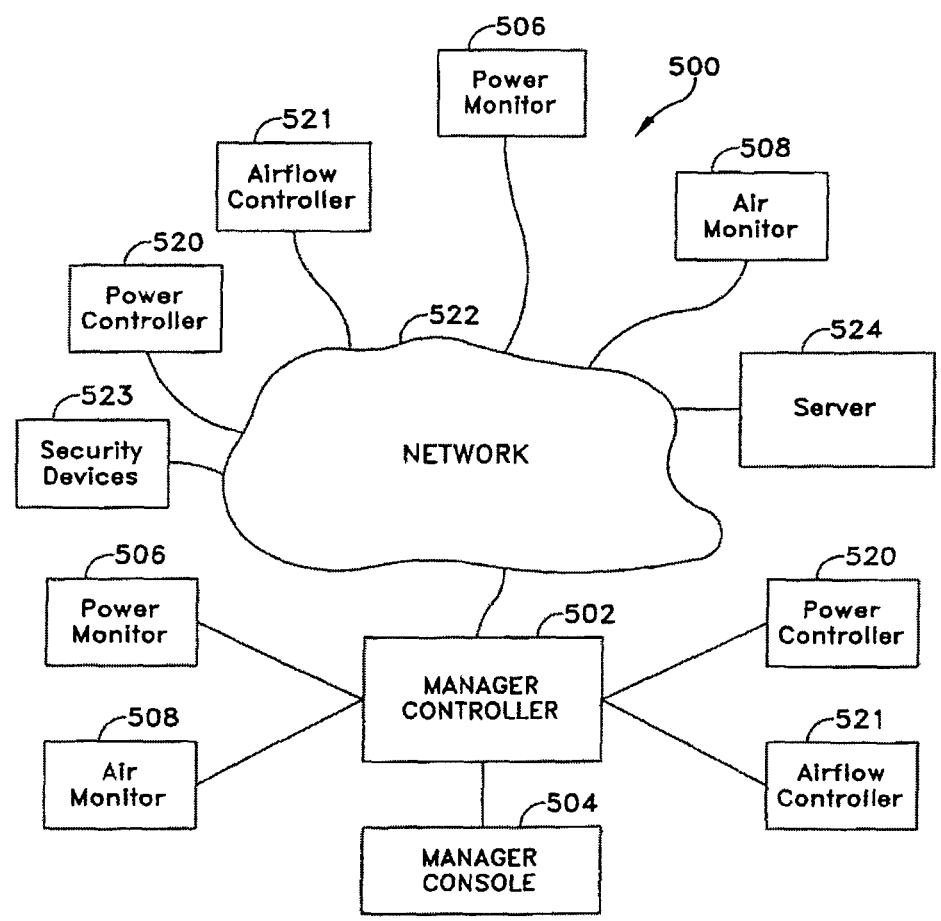
FIG. 6 is a functional block diagram of a management system in accordance with one embodiment of the invention.

FIG. 6 shows a block diagram of a management system 500 that may be used in embodiments of the present invention. The management system includes the manager controller 502, the manager console 504, power measurement devices 506, and airflow and temperature measurement devices 508. In addition, in one embodiment, the management system may include power control devices 520 to control application of power to one or more individual devices or racks contained within a data center, and the system may include airflow controllers 521 to control the airflow or supply temperature of an air conditioning unit or to control, for example, perforated tile dampers. As discussed above, the management system may also include one or more security devices 523, including security cameras. The devices of the management system 500 may be directly coupled to the manager controller or may be coupled to the manager controller using a network 522 that may be a dedicated network, may include the Internet, or may include a LAN or WAN contained in the data center. The manager controller may communicate with one or more servers 524 to obtain information from and control operation of the servers.

In one embodiment, the management controller 502 may be implemented at least in part using an Infrastruxure® Manager available from American Power Conversion Corporation (APC) of West Kingston, R.I., and devices may be coupled to the manager using, for example a controller area network (CAN) bus. The power controllers and airflow controllers may be implemented using available known devices that monitor and/or control power and airflow in facilities. Further, in at least one embodiment, the management system 500 may include systems and methods for monitoring and controlling power as described in U.S. Pat. No. 6,721,672 to Spitaels et al, which is incorporated by reference herein. Further, in at least one embodiment that uses in-row cooling devices, the management controller may communicate with the cooling units to control the units to ensure that adequate cooling at specified redundancy levels is being met. Further details regarding the control of in-row cooling units that can be used with embodiments of the invention are discussed in copending U.S. patent application Ser. No. 11/335,901 discussed above and filed on Jan. 19, 2006.

Figure 7:
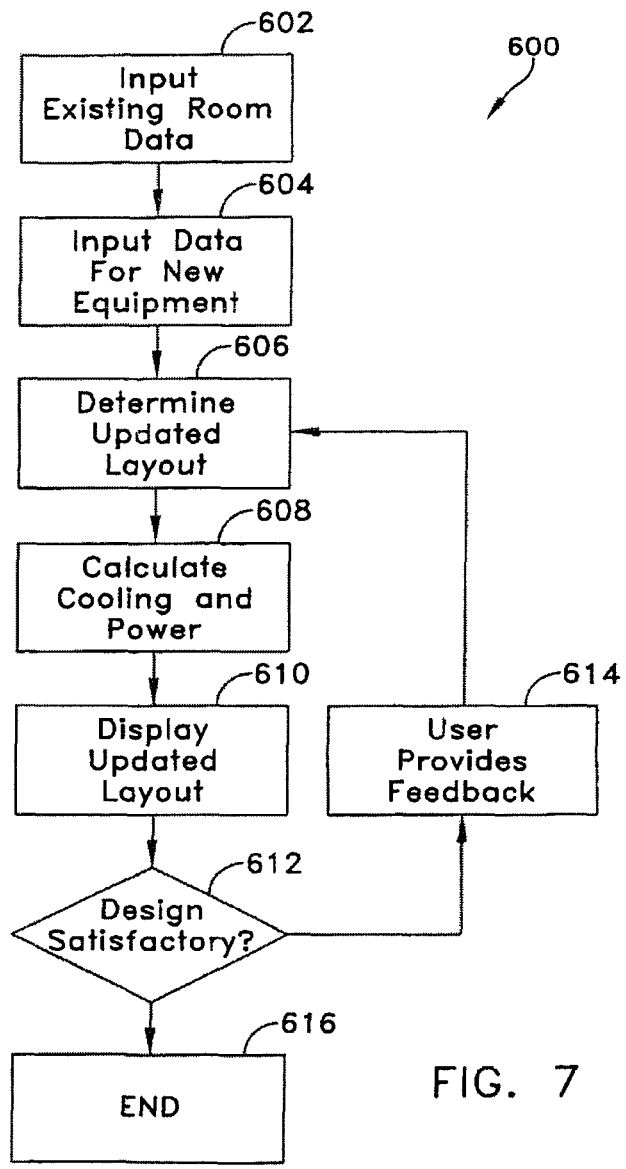
FIG. 7 is a flow chart of a management process in accordance with one embodiment of the invention.

One aspect of the present invention, which will now be described, is directed to a retrofit system and method that is particularly useful for adding new equipment to a facility. The addition of new equipment may include adding equipment to existing racks or may include adding equipment racks to a facility. The retrofit system may be a standalone computer system configured to perform processes described herein, or in one embodiment, the retrofit system is implemented using the system 200 described above. Specifically, the builder module 206 of the system 200 may include routines to assist in retrofitting a data center. A process 600 for using the system 200 (or some other system) to retrofit or upgrade a data center will now be described with reference to FIG. 7, which shows a flow chart of the process 600.

In a first stage 602 of the process 600, data related to a present configuration of a data center to be retrofitted is provided to the builder module. The data related to the present configuration may include the data displayed in the room model of FIG. 5 along with additional data that was generated during design of the data center. Further, in one embodiment, the data related to the present configuration may include data generated during an initial design as updated by actual measurements conducted in a facility. For example, the cooling capacity of individual racks may be calculated in an initial design and then updated by the management module once the system is installed and operating. Cooling capacity data may be updated based on actual measurements of airflow from, for example, perforated floor tiles, while the original data may have been calculated based on predicted airflows.

Information related to the retrofit is then provided in stage 604. The information related to the retrofit may include information similar to that input at stage 304 of process 300 described above, such as type of equipment, characteristics of equipment, number of racks, as well as other information. In addition, a user may designate one or more desired locations in the data center for the installation of new equipment. For example, a user may desire to add five additional servers to the data center, where the servers are similar to and have a related function to existing servers in the data center. The user may choose one or more preferred locations based on power specifications, cooling specifications and physical dimensions of the servers, and based on power capacity, cooling capacity and contents of existing racks displayed on a floor model of the data center. In addition, the user may indicate whether it is acceptable to move existing equipment to accommodate the installation of new equipment.

At stage 606, an updated layout for the data center is generated and cooling and power calculations are performed at stage 608 on the updated layout in the manner discussed above at stage 308 of process 300. If the user has designated specific locations for equipment in the data center, the layout may first be determined using these locations, and if problems arise as a result of the desired layout (i.e., lack of cooling for a rack), then the user will be able to note any such problems once the layout is displayed and can then choose to change the layout. If a particular layout is not designated by a user, then the system 200 will determine the layout in the manner discussed above with respect to stage 306 of process 300.

At stage 610, an updated floor model is displayed (for example, in the manner shown in FIGS. 5C and 5D), and at stage 612, a user can review the model and either provide feedback (stage 614) or indicate that the design is satisfactory. Once the floor model has been approved by a user, the retrofit design process is complete, and the equipment may be installed and parameters of the data center may be measured and updated in the manner described above in stages 318 to 322 of process 300 using for example a data center management system.

In the processes 300 and 600 described above, design and analysis stages are performed after all data is entered as part of an initial design or a retrofit of a facility. In another embodiment, analysis is performed real-time, and user displays are updated as the user enters data into the system.

In embodiments of the present invention, using the processes described above, data center operators are able to determine, in essentially real-time, whether additional equipment may be added to a data center and may also determine locations for the equipment, where both power and cooling requirements of the equipment may be met. Further, reports can be generated that indicate to a user or data center manager how much capacity is available for each row, for each rack and for the facility in its entirety. Still further, as discussed above, in determining overall capacity, systems and methods are able to identify stranded capacity, and provide suggestions for reducing the stranded capacity.

In the processes and systems described above, cooling calculations for a data center and for equipment in the data center are performed as part of the design process for the data center, during operation of the data center, and during an upgrade or retrofit of the data center. In embodiments of the present invention, in determining equipment layout and performing cooling calculations, initial information on characteristics of the facility itself are identified to determine if there is sufficient cooling at the facility level. These characteristics include, for example, whether a raised floor or drop ceiling is used as an air plenum, the location and characteristics of air conditioning units (including in-row cooling units), dimensions of the room that are to house the data center, and total power draw of the data center. Based on this information, an initial determination may be made as to whether there is sufficient cooling provided by the air conditioning units for the expected power draw in the room, and if not, a recommendation may be made for additional air conditioning units. For some facilities, desired redundancy and operating margins may be included in this determination.

Once the determination has been made that there is sufficient cooling at the facility level, an analysis is conducted to determine if there is adequate cooling at each rack in the facility and/or at individual pieces of equipment. In at least one embodiment, the cooling capacity of a rack may be determined by increasing the power level of the rack to determine at what additional power level the airflow to the rack becomes inadequate. This can be performed individually for each of the racks in a data center. In different embodiments of the present invention, one or more of a number of different methods may be used to perform the cooling calculations. These methods include, but are not limited to, a computational fluid dynamics (CFD) analysis, a Coarse-Grid CFD analysis (designated as CGCFD), a control volume analysis (designated as CVA), and an analysis based on empirical rules and/or borrowing concepts. Further, in some embodiments, a combination of two or more of the above methods may be used to conduct portions of an overall analysis. In one embodiment, the principle of superposition is used to combine results of portions of an analysis. In particular, in many applications the airflows may be considered to be ideal, where an ideal airflow is inviscid, incompressible, irrotational without any other forces, such as buoyancy. With such an ideal airflow, a complex application can be reduced to a number of less complex applications, analysis of the less complex applications can be performed using one of the methods described herein, and superposition can be used to combine the results of each of the less complex applications to obtain analysis results for the complex application.

A computational fluid dynamics analysis can be used in one embodiment in association with the design and retrofit of a data center to provide detailed results of the cooling performance of a facility, including determining the availability of adequate cooling air at racks and individual pieces of equipment in the facility and determining cooling capacity for each rack. The techniques for implementing a CFD analysis of a data center are known. A CFD analysis must typically be performed by someone particularly skilled in the art, typically requires detailed information regarding the facility and the layout of equipment in the facility, and depending on the complexity of the analysis conducted, and the computing equipment used to conduct the analysis, may take hours or days to run one iteration of the analysis.

In another embodiment, an improved technique for conducting the cooling analysis is used. The improved technique has been developed based on computational fluid dynamics techniques. The improved technique is referred to herein as a Coarse-Grid CFD or simply CGCFD. In a typical CFD analysis, a data center to be analyzed is typically divided into non-uniform cells in the range of one to eight inches on a side. In at least one embodiment, in the CGCFD analysis, a Cartesian grid system of cells that are one foot cubes are used. The use of uniform one foot cells typically reduces the number of cells used in the calculations from a traditional CFD analysis by at least an order of magnitude. Further, uniform grid cells generally make the CFD analysis faster and more reliable relative to a comparable non-uniform cell analysis. Further, other techniques are employed in the CGCFD analysis to improve the computational efficiency of the analysis. These techniques include: the use of simple turbulence models, initializing the analysis with data obtained from the results from a prior similar solution, using two dimensional or partial two dimensional representations when possible to simplify calculations, and tailoring a CGCFD routine for a specific application. The use of two dimensional representations may be used, for example, in a raised floor or ceiling plenum, where pressure gradients in the depth direction can be neglected in the computations.

The tailoring of a CGCFD routine can be used in embodiments of the present invention to significantly improve computational efficiency and improve robustness (for example, so the tool can be made to work reliably in an autonomous way) of the total analysis, and multiple tailored routines may be used in combination to produce a complete analysis. For example, a first CGCFD routine may be tailored for use with different raised floor configurations to determine the output airflow at each perforated floor tile of a raised floor in a data center, and a second CGCFD routine may be tailored for use with a cluster of racks that include two rows of racks with a cold aisle between the rows. The first CGCFD routine may be run to determine the output air at perforated tiles in the cold aisle of the rack cluster, and the second CGCFD routine may use the results of the first routine to determine the airflows and temperatures at inlets and outlets of the racks. The second routine may be run a number of times to account for all of the clusters of racks located in a data center. As equipment is moved, and as different configurations are established within a cluster to optimize cooling performance, the second routine may be run to obtain new cooling data without the need to repeat the first routine, as the airflows from the perforated tiles generally would not change. In some cases, for perforated floor tiles having a large percentage of open area (for example, greater than 50%), it may be desirable to repeat the first routine as air flows may change based on room configuration.

Embodiments of the invention that utilize the CGCFD approach to conduct the analyses of a data center provide advantages over embodiments that utilize a traditional CFD approach. These advantages include computational efficiency and simplification of use. Iterations of cooling calculations using the CGCFD approach may be conducted in a matter of seconds or minutes versus hours or days with a full CFD analysis. Further, the CGCFD routines may be designed to operate with a limited set of input variables, allowing a less-skilled user to conduct analyses using the CGCFD approach. For example, for a CGCFD routine that is tailored to analyze only the raised floor plenum, the input variables may be limited to the height of the floor, location and type of perforated tiles, length and width of the floor, and the locations and characteristics of air conditioning units that provide cooling air to the raised floor. For a CGCFD routine that is tailored to conduct an analysis on a cluster of racks, the input data may be limited to airflow per tile (could be obtained automatically from the output of a separate CGCFD routine or using other methods), the number of racks in the cluster, the power draw of each of the racks, and room environmental details including the temperature of the surrounding environment, ceiling height, the presence of nearby walls, etc. The output data for a cluster of racks may include the input temperature at each server, or other piece of equipment in a rack. In other embodiments, the output data may simply be a measure of the amount of warm recirculated air drawn into each rack. The data may be expressed as an absolute number (e.g. in terms of cfm) or expressed as a fraction of the total air consumed by the rack. A system, such as system 200 described above, may use the output data to determine if the cooling performance of the cluster is satisfactory.

In another embodiment, another improved technique for conducting the cooling analysis is used. The improved technique is referred to herein as a control volume analysis or simply CVA. The control volume analysis may be used in conjunction with a CFD analysis and/or a CGCFD analysis, or may be used as a stand alone process. The CVA technique is similar in some aspects to the CGCFD technique described above, however, further simplification of the analysis process is provided. As will be discussed below, the CVA technique is a computationally efficient technique that is particularly effective for computing the three-dimensional airflow, pressure and temperature distributions in the cold aisle of a raised floor data center. However, the CVA technique is not limited in its use to this application and may be used for other applications as well. The CVA technique can provide output data in essentially real-time, allowing a user to try various locations for equipment as part of an initial design or a retrofit and obtain cooling data for the different locations in real-time.

The CVA technique will be described with reference to FIG. 8, which shows a subsection 700 of a data center. The subsection of the data center includes a cluster of racks that includes a first row of racks 702, and a second row of racks 704, which are located on a raised floor and separated by two rows of perforated tiles 706, 708.

Figure 8:
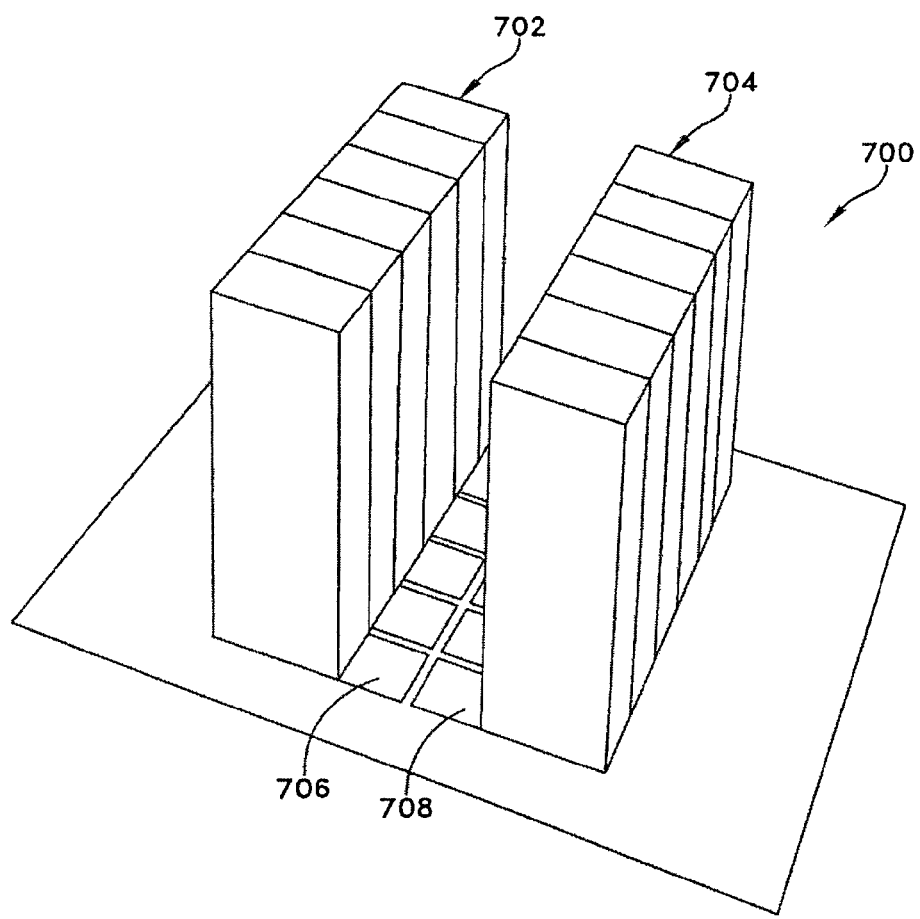
FIG. 8 shows a perspective view of a cluster of racks whose cooling performance can be analyzed using embodiments of the invention.

In data centers that have clusters of racks arranged like those in FIG. 8, it is not uncommon for undesirable hot spots to develop even though the total supply of cool air to the cluster should be sufficient to meet the needs of the racks. For example, if the airflow rate through one or more perforated tiles is too great, a rack may be unable to capture all of the tile airflow and some of the cooling air may escape the cold aisle. Racks will generally draw their required air, and in this situation, if a rack can not capture cool air, it may draw hot exhaust air over the top of the rack creating a hot spot. Further, due to widely varying cooling airflow requirements, racks may compete with one another for cooling airflow. In particular, a high-power rack may borrow underutilized air from an adjacent rack, or in some cases from a rack separated by several tiles. With several racks contained in a cluster, with each having different cooling needs, the airflow patterns and temperature distribution in the cold aisle are complex functions. The CVA technique can be used to simplify the solutions to these complex functions.

In the CVA analysis for the rack cluster of FIG. 8, the airflow and temperature analysis is conducted on the volume of air contained in the cold aisle, between the racks, from the perforated tiles up to a height equal to the top height of the racks. The volume of air is divided into a number of control volumes equal to the number of racks in the cluster. Each control volume is defined as the volume above one of the perforated tiles extending from the perforated tile to the top of the racks. The control volume analysis includes determining for each control volume, the airflow through each of the six faces of the control volume. Once the airflows are known, temperatures and mass species concentrations can be determined for each of the control volumes. In the CVA technique, the temperature analysis can be decoupled from the airflow analysis because, as discussed above, buoyancy forces in the control volumes can be ignored. Similarly, mass species concentrations are not coupled to the airflow solution and may also be computed separately if desired in order to compute the fraction of recirculated air ingested by each rack.

In conducting a CVA analysis in the embodiment described herein, there are several initial assumptions made to simplify the analysis. In other embodiments, the analysis could be changed if these assumptions would not apply. The first assumption is that airflow across each face of a control volume (and therefore into the front face of a rack) is considered uniform. Resulting airflow and temperature values effectively represent an average of the airflow and temperature at each face.

The second assumption is that buoyancy forces within each control volume are negligible. Unless a significant hot spot develops, then there is insufficient heating of the air in a cold aisle to substantially affect airflow patterns, and even if some heating occurs, any buoyancy effects are small compared to the momentum of the airflow from typical perforated tiles.

The third initial assumption is that viscosity and turbulence within each control volume are negligible. In the control volumes, air is introduced through the perforated tiles and is pulled into the racks. The air is not required to change direction rapidly and there is no flow of air parallel to solid objects. Accordingly, viscosity and turbulence may be ignored and the competition of forces driving the airflow reduces to an interplay between pressure and momentum.

Figure 9:
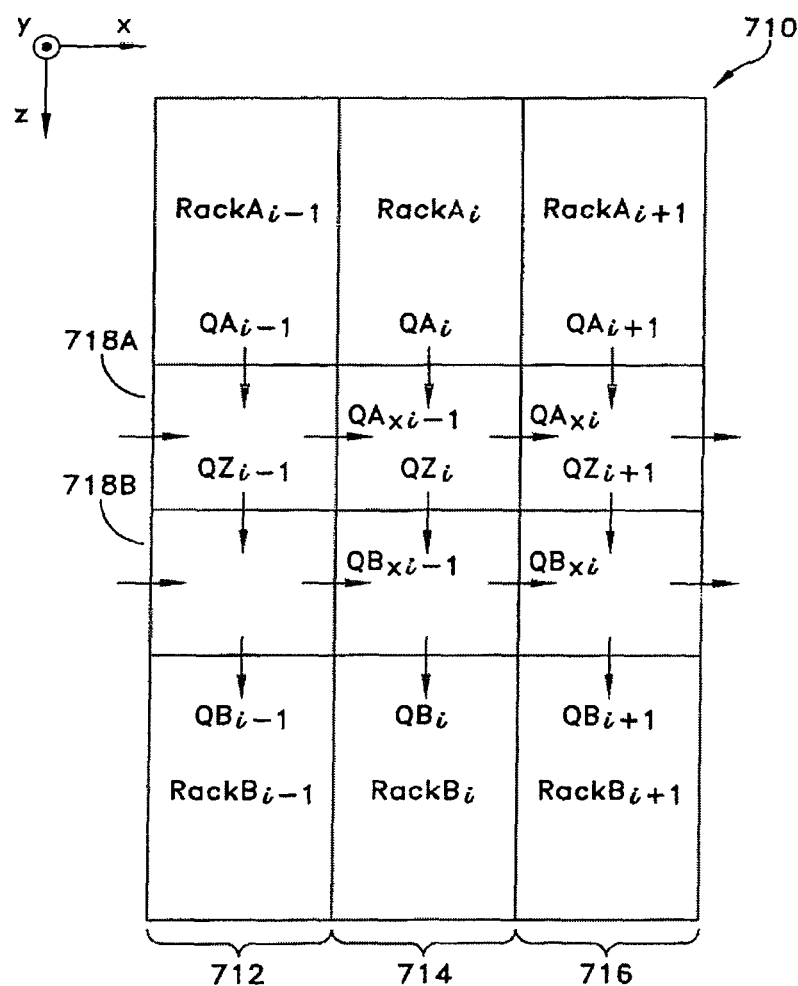
FIG. 9 shows a top view of a cluster of racks whose cooling performance can be analyzed using a control volume analysis technique of at least one embodiment.

The CVA analysis may be further simplified by dividing a cluster of racks into slices of two racks separated by two perforated tiles 718A, 718B. FIG. 9 shows a cluster of six racks 710 that can be divided into three two-rack slices 712, 714, 716. The nomenclature used for identifying racks, and airflows in FIG. 9 is defined in Table 1 below, along with other variables that will be used herein in the description of the CVA technique.

TABLE 1

| | |
|---|---|
| $A_s$, $A_t$ | Control volume side and perforated tile area |
| $C_1$, $C_2$ | Dimensionless empirical constants in the y and x-momentum equations |
| C | Species Concentration |
| CV | Control volume |
| N | Number of 2-rack slices in cluster |
| $\hat{n}$ | Outward unit normal vector |
| $PA_i$, $PB_i$ | Pressure in control volume above perforated tiles $A_i$ and $B_i$ |
| $P_{amb}$ | Ambient reference pressure |
| $M_L$, $M_R$, $M_T$ | z-direction momentum flux terms through left, right, and top surfaces of staggered CV at slice i |
| $TA_i$, $TB_i$ | Temperature in control volume above perforated tiles $A_i$ and $B_i$ |
| $Q_t$ | Airflow rate through each perforated tile |
| $QA_i$, $QB_i$ | Airflow rate through racks $A_i$ and $B_i$ |
| $QAx_i$, $QBx_i$ | Airflow rates in the x-direction above perforated tiles $A_i$ and $B_i$ |
| $Qz_i$ | Airflow rates in the z-direction above perforated tiles between tiles $A_i$ and $B_i$ |
| $QAtop_i$ $QBtop_i$ | Airflow rates in the y-direction above perforated tiles $A_i$ and $B_i$ at top-of-rack height |
| $\vec{V}$ | Velocity Vector |
| $\alpha$ | Linear relaxation factor |
| $\rho$ | Density of air |

At the start of the CVA analysis, the rack airflows $QA_i$, $QB_i$, and the tile airflows are known. The tile airflows can be estimated based on the mean perforated tile airflow for the entire facility or determined using a CFD analysis, a CGCFD analysis, physical measurement, or using one of a number of known programs. The rack airflows can be determined based on characteristics of equipment installed in the rack. In one embodiment, each rack airflow is determined on the basis of the power usage of the rack and using the relationship of 160 cfm per kilowatt of power as discussed above. To determine the airflow patterns, all airflows $QAx_i$, $QBx_i$, $Qz_i$, $QAtop_i$, and $QBtop_i$, and pressures $PA_i$, and $PB_i$ are computed based on the principle of conservation of mass and momentum. To perform this computation, a total of 7n−2 unknowns (5n−2 internal airflows plus 2n pressures) may be determined using a total of 7n−2 equations, where n is the number of 2-rack slices (or length of cluster expressed in tile or rack widths). Optionally, an energy balance or mass species balance can then be used to compute the 2n temperatures or 2n species concentrations based on the airflows.

In one embodiment, rather than solve all equations simultaneously, a semi-simultaneous approach is taken. In this embodiment, the five unknowns for each two-rack slices of a rack cluster, airflows $Qz_i$, $QAtop_i$, and $QBtop_i$, and pressures $PA_i$, and $PB_i$, are first determined simultaneously. During these initial computations, each two-rack slice is considered in isolation, which is the equivalent of having the ends of the slices blocked, such that $QAx_i$ and $QBx_i$ are equal to zero. After an initial sweep through each two-rack slice is complete, the side-to-side airflows ($QAx_i$, $QBx_i$,) can be computed based on the calculated pressures within each control volume. The side-to-side airflows affect the pressures, and after computing the side to side airflows, a second computation of the airflows and pressures is conducted for each of the two-rack slices. This process is repeated until there are no significant changes in the computed variables. Once all airflows are known, all temperatures or mass species concentrations can be computed directly without the need to do multiple iterations.

The fundamental equations used to compute the unknowns described above, assuming steady state, incompressible and inviscid fluid flow rely on conservation of mass (m), conservation of momentum (M) conservation of energy (e) and conservation of species concentration (C), and can be written as follows:

$$\int_A (\vec{V} \cdot \hat{n}) dA = 0 \tag{m}$$

$$\int_A (\rho \vec{V} \cdot \hat{n}) \vec{V} dA = -\int_A p \hat{n} dA \tag{M}$$

$$\int_A T(\vec{V} \cdot \hat{n}) dA = 0 \tag{e}$$

$$\int_A C(\vec{V} \cdot \hat{n}) dA = 0 \tag{C}$$

Applying the conservation of mass equation (m) to the two-rack slices for the conditions described above results in the following equations:

$$Q_t + QA_i + QAx_{i-1} = Qz_i + QAx_i + QAtop_i \tag{1}$$

$$Q_t + Qz_i + QBx_{i-1} = QB_i + QBx_i + QBtop_i \tag{2}$$

Where $QA_i$ is always negative based on the sign convention of FIG. 9.

Figure 9A:
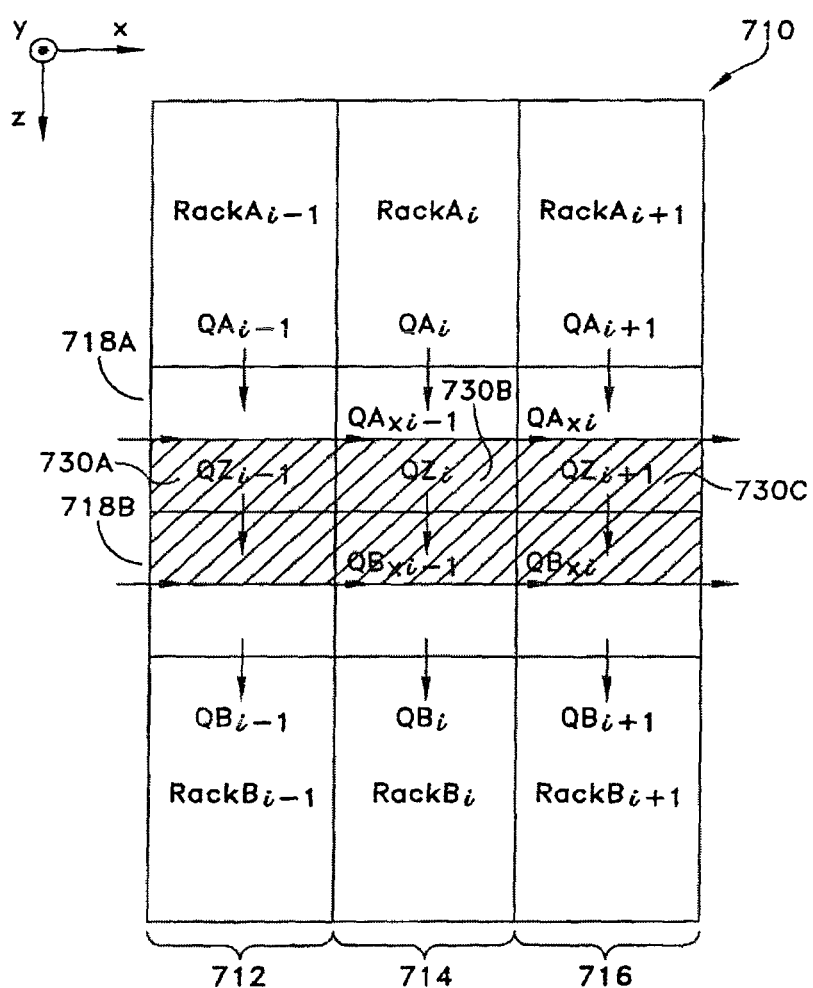
FIG. 9A shows the cluster of racks of FIG. 9 along with staggered control volumes that may be used in the control volume analysis technique.

As will now be described, staggered control volumes are used to formulate the z-momentum equations. Three staggered control volumes 730A, 730B and 730C are shown in FIG. 9A. The number of staggered control volumes is equal to the number of 2-rack slices. The staggered control volumes are the same size as the main control volumes, but are shifted so that they are located midway between opposing racks. The staggered control volumes allow pressure to be considered more easily for each face which is normal to the z-direction. If the original control volumes are used, then each control volume would have one face coplanar with a rack inlet, which is a face over which the pressure is not known and need not be known in the calculations. Applying the conservation of momentum equation (M) in the z-direction to the staggered control volume in slice i results in the following equation:

$$PA_i - PB_i = (\rho/(4 A_s^2)) \{(Qz_i + QB_i)^2 - (QA_i + Qz_i)^2\} + M_L + M_R + M_T \tag{3}$$

In equation (3), the first term on the right hand side of equation (3) is generally dominant, as it accounts for the effect of rack airflow rates on control volume pressures. $M_L$, $M_R$ and $M_T$ account for losses or gains in z-momentum through the sides and the top of the control volume.

Using an "upwind" estimate for incoming/outgoing z-momentum and assuming that the velocity of the air in the z-direction is negligible above the racks, $M_L$, $M_R$ and $M_T$ are determined using the equations of Table 2 below

TABLE 2

| IF | THEN | ELSE |
|---|---|---|
| $QAx_{i-1} + QBx_{i-1} \geq 0$ | $M_L = -(\rho/(2A_s^2))$ $(QAx_{i-1} + QBx_{i-1})Qz_{i-1}$ | $M_L = -(\rho/(2A_s^2))$ $(QAx_{i-1} + QBx_{i-1})Qz_i$ |
| $QAx_i + QBx_i \geq 0$ | $M_R = (\rho/(2A_s^2))$ $(QAx_i + QBx_i)Qz_i$ | $M_R = (\rho/(2A_s^2))$ $(QAx_i + QBx_i)Qz_{i+1}$ |
| $QAtop_i + QBtop_i \geq 0$ | $M_T = (\rho/(4A_s^2))$ $(QAtop_i + QBtop_i)Qz_i$ | $M_T = 0$ |

The relationship between Y-momentum and pressure may be written using equations (4) and (5) as follows:

$$PA_i - P_{amb} = (\rho/A_s^2)\{C1[Q_t + \tfrac{1}{2}(QAi + QAx_{i-1} - QAx_i - Qz_i)]^2 - \tfrac{1}{2}QAtop_i^2\} \quad (4)$$

$$PB_i - P_{amb} = (\rho/A_s^2)\{C1[Q_t + \tfrac{1}{2}(Qzi + QBx_{i-1} - QBx_i - QB_i)]^2 - \tfrac{1}{2}QBtop_i^2\} \quad (5)$$

Figure 10:
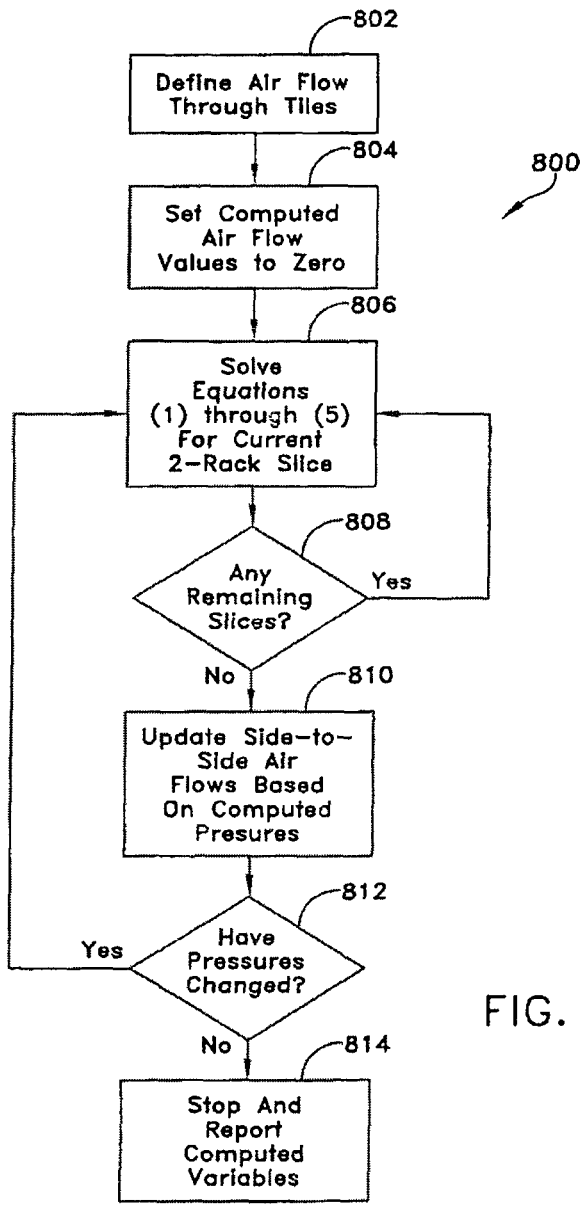
FIG. 10 is a flow chart of a control volume analysis technique in accordance with one embodiment of the invention.

In one embodiment, equations (1) through (5) are solved simultaneously for each 2-rack slice of a cluster sequentially using the process 800 shown in FIG. 10. In the first stage 802 of process 800, the user defines $Q_T$ (the airflow through the perforated tiles), the number of 2-rack slices in the cluster, and the power draw of each of the racks. As discussed above, $Q_T$ may be estimated as the mean perforated tile airflow rate for the entire facility or determined separately using, for example, a CFD or CGCFD analysis or other analysis or physical measurement. At stage 804, all airflow variables (except $Q_T$ and the rack inlet airflows) are initialized to zero. At stage 806, equations (1) through (5) are solved simultaneously for each slice. At decision block 808 a determination is made as to whether the equations have been solved for all slices, and if not, stage 806 is repeated. Once the equations have been solved for all slices, then at stage 810, the x-direction airflow variables are updated based on the computed pressures in the control volumes, $PA_i$ and $PB_i$ as discussed below. At stage 812, a determination is made as to whether the computed pressures have changed by more than a predetermined threshold since the previous iteration and if so, stages 806 to 812 are repeated. Once there is no significant change in the computed variables, the process 800 stops at stage 814, at which point the pressures and airflows for all of the control spaces have been determined.

In the process 800, at stage 810, new x-direction airflow values ($QA_{xi}$ and $QB_{xi}$) are determined based on the assumption that the pressure drop between adjacent cells is proportional to the square of the airflow rate using the equations in Table 3.

TABLE 3

| IF | THEN | ELSE |
|---|---|---|
| $PA_i \geq PA_{i+1}$ | $QAx_i = A_s\{(PA_i - PA_{i+1})/(\rho C_2)\}^{1/2}$ | $QAx_i = -A_s\{(PA_{i+1} - PA_i)/(\rho C_2)\}^{1/2}$ |
| $PB_i \geq PB_{i+1}$ | $QBx_i = A_s\{(PB_i - PB_{i+1})/(\rho C_2)\}^{1/2}$ | $QBx_i = -A_s\{(PB_{i+1} - PB_i)/(\rho C_2)\}^{1/2}$ |

In one embodiment, because of non-linearities of the equations, adjustments to the x-direction airflow values at stage 810 are achieved gradually by introducing damping into the iterative process and updating the values of $QAx_i$ and $QBx_i$ using the following equations (6) and (7).

$$QAx_i = \alpha QAx_i^{new} + (1-\alpha)QAx_i^{old} \quad (6)$$

$$QBx_i = \alpha QBx_i^{new} + (1-\alpha)QBx_i^{old} \quad (7)$$

In equations (6) and (7), $\alpha$ is a linear relaxation factor. If a is set to zero, then no changes will occur from iteration to iteration. If $\alpha$ is set to 1, then there will be no damping introduced. For smaller values of $\alpha$, more iterations will be required, however, the chances of obtaining a stable solution increase. The particular optimum choice of $\alpha$ is problem specific, however, it has been found that values of $\alpha$ around 0.05 work well in the process described above. Once the airflows are computed using the process above, temperatures and mass species concentrations can be calculated, if desired. It should be noted that control volumes may be used to compute temperatures or concentrations regardless of the method used to initially compute airflows.

The CVA technique described above can be conducted separately, one for each cluster of racks in a facility to obtain a complete cooling analysis of the facility. When a retrofit of a facility is to be done, the control volume analysis may be done for all clusters, or only for those in the vicinity of any changes to the facility.

Three different methods, CFD, CGCFD and CVA, have been described above for determining cooling data in embodiments of the present invention to determine placement of location of equipment in data centers. In still another embodiment, empirical rules are used either alone or in combination with one of the methods described above to determine proper placement of equipment and the adequacy of cooling air. The empirical rules that are used may take a number of different forms, and programs incorporating the empirical rules may be updated as more data is generated to support the empirical rules. In one embodiment, empirical rules are based, at least in part, on the ability of equipment racks to borrow unused capacity from surrounding neighbors. The amount that may be borrowed may be limited to an allowable fraction (or weight) of the unused capacity and the particular allowable fraction may differ depending on a number of variables such as borrower-donor separation distance, tile flow rate, and the total power draw of both the borrower and the donor.

In one particular embodiment, the cooling air available to a given rack is computed based on a weighted summation of the available airflows from airflow sources (i.e., supply devices, including in-row cooling units, or vents), net of airflows computed to be used by other racks, where the weights associated with the available airflows for a given rack decrease with distance between the rack and the air supply devices or vents. For example, with reference to FIG. 9, the cooling air available to each rack may initially be set equal to the cooling air supplied by the perforated tile in front of the rack, or to reflect possible losses, and provide safety margin, the cooling air available may be set equal to some amount (i.e. 90%) of the total air from the perforated tile. The cooling load for each rack is then subtracted from the available air to provide a net available cooling air figure for each perforated tile and to provide an initial indication of a lack of cooling air for any equipment rack. For each equipment rack, the available cooling air is then increased by assigning to each rack, a percentage of the net available cooling air from nearby perforated tiles. For example, the cooling air available may include 10% of the net available cooling air from a perforated tile associated with either an adjacent rack or a rack across an aisle, and 5% of the net available cooling air from a perforated tile of a diagonal rack or a rack two positions over in a row. The particular percentages or weights used may be changed based on actual results or as a result of analyses conducted. The loads of each rack may then be compared with the total available cooling air to determine remaining cooling capacity and to identify any potential problem racks.

In at least one embodiment, empirical rules may be used in combination with superposition to analyze data centers and provide recommended equipment layouts. Using superposition, complex problems may be broken down into simpler problems that can then be solved using empirical rules.

In one embodiment, empirical rules are established by initially performing a number of CFD analyses on typical rack layouts, and the results of these analyses are used to produce simple equations or look-up tables that can be used in real-time to design layouts of equipment. In such an analysis, the side-to-side airflows, such as those shown in FIG. 9 may be determined for each rack one at a time with one rack turned "on" and all other racks turned "off". The airflows at the ends of a cluster for a number of different configurations may also be determined using CFD. The airflows may be determined for a number of different air intake values for each rack and a number of different values of air flow from the perforated tiles. The total air flows for different configurations can then be determined in real-time using superposition and the stored results. The airflows through the top (in or out) of the volume in front of each rack may then be determined based on conservation of mass. In one embodiment, when the airflow into the top of one of the volumes exceeds some percentage (i.e., 20%) of the total air flow into the rack associated with the volume, then an overheating problem may exist requiring a design around. In other embodiments, mass species concentration analyses may be used in combination with empirical rules to determine what percentage of the total air entering a control volume is recirculated air to determine when an overheating problem may exist.

In determining the airflows for each rack of a cluster, symmetry of the clusters can be used to reduce the number of CFD analyses that need to be performed, and the control volumes discussed above with respect to FIG. 9 may be used to establish a reference grid for the analysis. For example, with reference to the cluster of racks 710 of FIG. 9, CFD analyses need only be performed for Rack $A_{i-1}$, and Rack $A_i$, and the results for each other rack may be determined based on the resulting airflows and the relative position of the racks. For example, the airflows in the cluster associated with Rack $B_{i+1}$ are the same as those associated with Rack $A_{i-1}$ with the direction of some of the airflows changed for corresponding Rack A and Rack B inlet airflow and tile airflow rates.

In one example, which will now be described, the concepts of symmetry and superposition are used in conjunction with CFD analyses and empirical rules to provide a practical real-time solution for determining air flows in a cool aisle. Further, air flows are used to determine a recirculation index (RI) for a row of racks, which can be used to identify potential "hot spots" in a data center. As discussed above, one cooling objective in a data center is to manage the equipment rack inlet air temperatures. The rack inlet air temperatures are dominated by the airflow patterns within the cold aisle and the temperatures within and around the cold aisle. Air drawn in from outside the cold aisle is generally heated to some degree by the rack exhaust and will be hereafter referred to as "recirculated air". While the temperature of the recirculated air is highly application dependent, air that passes directly from a perforated tile to a rack inlet will be very near the supply temperature. Thus, good cooling performance can be achieved if all of the airflow ingested by a rack comes directly from the perforated tiles.

A cluster of racks, which receives its required cooling air exclusively from the perforated tiles within the cluster, represents an autonomous scalable unit from which a larger facility with predictable cooling performance may be constructed. A reasonable requirement is therefore to ensure that racks are adequately cooled by air originating from the racks own cold aisle. Conversely, it is acceptable for the rack to ingest no more than a small fraction of recirculated air.

With the above in mind, the recirculation index (RI) is defined as the fraction of recirculated air ingested by the rack. An RI of 0% implies that all of the rack inlet air was drawn directly from the perforated tiles while an RI of 100% implies that all of the rack inlet air was drawn from outside of the cold aisle. Note that a low RI is sufficient to guarantee cool inlet temperatures; however, a high RI does not guarantee excessively high inlet temperatures.

The concepts of control volumes, symmetry and superposition are used in the present example to determine air flows and ultimately RI for a cold aisle. In using superposition, a sum of velocity potentials (or actual velocity components or total airflows over a consistent area) of simpler, elemental flow solutions is used to obtain a new, composite flow solutions. For example, assume we know the airflow pattern associated with only Rack A1 "on" subject to a particular tile airflow rate and we also know the airflow pattern with Rack B3 "on" subject to the same perforated tile airflow rate. The relevant horizontal airflow components can be added to obtain a solution, which approximates the airflow pattern resulting from Racks A1 and B3 both "on" simultaneously. The airflow pattern resulting from the superposition of the two separate airflow patterns is not exactly the same as the full solution—even for an ideal flow. Using superposition two solutions are added together which individually (and when added together) satisfy conservation of mass criteria. The use of superposition does not guarantee that the combined solution will be the unique solution and the difference is in the boundary conditions. As an illustration of this, consider a 2-rack example. In using superposition, the top airflow condition floats freely as a constant-pressure boundary condition in all cases. In reality, the airflow pattern constructed from superposition may not provide a perfect match to air velocity over the top surface of the cold aisle. Also, when one rack is off, an assumption is made that the face (inlet) of the rack is a symmetry boundary condition (which is consistent with an inviscid analysis). This result creates the opportunity for some flow parallel to the face of the rack, which would probably not exist when the rack is actually drawing air.

In the example, superposition is used to establish only the 3n−2 internal horizontal airflows (n being equal to the length of the row in terms of racks) while end-of-row horizontal airflows are computed based on separate empirical correlations. Vertical airflow components are computed from a mass balance performed on each control volume. The horizontal airflows clearly depend on tile airflow. For example, a rack of a given airflow rate may be able to draw cooling air from a distance of many tile-widths when the perforated tile airflow rate is very low. However, this range of influence is much less as the tile flow rate is substantially increased. (As we know from the non-dimensional argument, the results would be identical if all airflows are scaled by the tile flow rate.) Therefore, the tile airflow rate is included in the analysis; the floor tiles should be "turned on" in the CFD analysis used to correlate airflow patterns. However, if the floor tiles are left "on"

and the effect of each rack is considered individually, when the flows for each rack are summed, the sum would have more airflow leaving the top of the cold aisle than in reality. The answer is to correlate only the horizontal airflows and then simply compute the correct airflow into or out of the top of each control volume based on conservation of mass.

It is worth emphasizing that the use of the non-dimensional airflow and, in particular, superposition, simplifies the method. Without these simplifications, there would be many combinations of rack and tile airflows to evaluate and store empirically to cover a range of practical applications.

Figure 11:
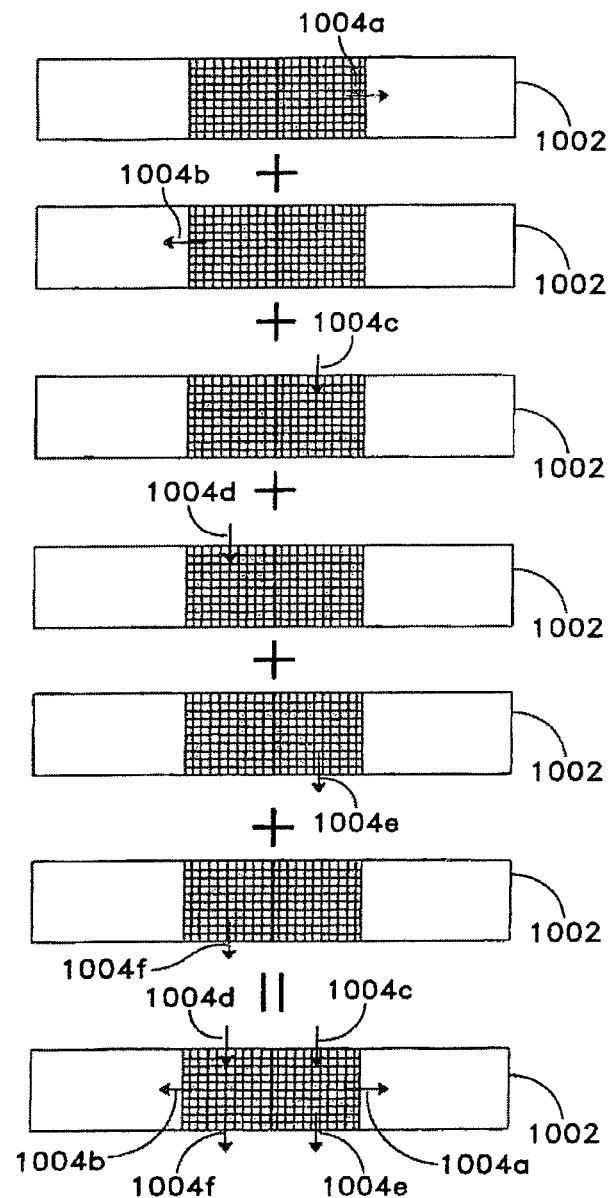
FIG. 11 is a diagram demonstrating a principle of superposition used in one embodiment.

Based on the above discussion, the complete airflow solutions to any rack layout of interest can be constructed using superposition. Elemental building-block airflow patterns are associated with each rack and each of the four end-of-row airflows are turned on individually as illustrated in FIG. 11 for the case of a 2-rack cluster 1002. It is important to stress that FIG. 11 illustrates which airflow boundary conditions are turned on and off in each of the elemental airflow solution to yield the total solution with all airflow boundary conditions "on". Each of arrows 1004a to 1004f represents one of the airflows. It is the airflow components internal to the cold aisle that are actually being combined. There are, in general, a total of 2n+4 elemental solutions for any layout, which makes up a complete airflow solution. Obviously, fewer elemental solutions are required if some racks have zero airflow and the ends of the cold aisle are sealed (e.g. with doors).

The elemental airflows used with superposition may be determined in any manner including physical testing. In the present example, CFD modeling for the cold aisle is performed using the following boundary conditions:

Fixed velocity of air leaving the computational domain over the area of a rack face for any rack which is "on"

Fixed velocity entering or leaving the domain over the area of the end of the rows for any end-of-row flow "on".

The top of the solution domain is "open" for air to enter or exit to the surrounding environment held at constant pressure.

All other surfaces are "symmetry" surfaces.

As stated above, there are in general 2n+4 elemental solutions for each row length; 2n elemental solutions associated with each rack turned on plus four end-of-row elemental solutions. Each elemental solution covers a range of dimensionless flow rates so that any arbitrary, but practical, rack or end airflow rate can be considered. So, the task is reduced to determining and storing the 3n−2 internal horizontal control volume airflows over an appropriate range of dimensionless airflow rates.

Because of the geometric symmetry of a cluster of racks, only the 3n−2 internal airflows for approximately one quarter of the 2n+4 rack and end-of-row boundary conditions are considered and stored; n/2+1 boundary conditions if n is even and (n+1)/2+1 if n is odd. The remaining internal airflows are determined from an appropriate reinterpretation of the smaller data set by changing variable indices and signs. In addition to being efficient, this use of symmetry, forces the final output from the rack cooling performance tool to be perfectly symmetric. Each of these boundary conditions are driven individually through a range of dimensionless airflow rates while keeping track of all of the "response" airflow rates internal to the cluster. The result can be summarized in a plot of "response" airflow rates; one plot for each elemental boundary condition.

Figure 12:
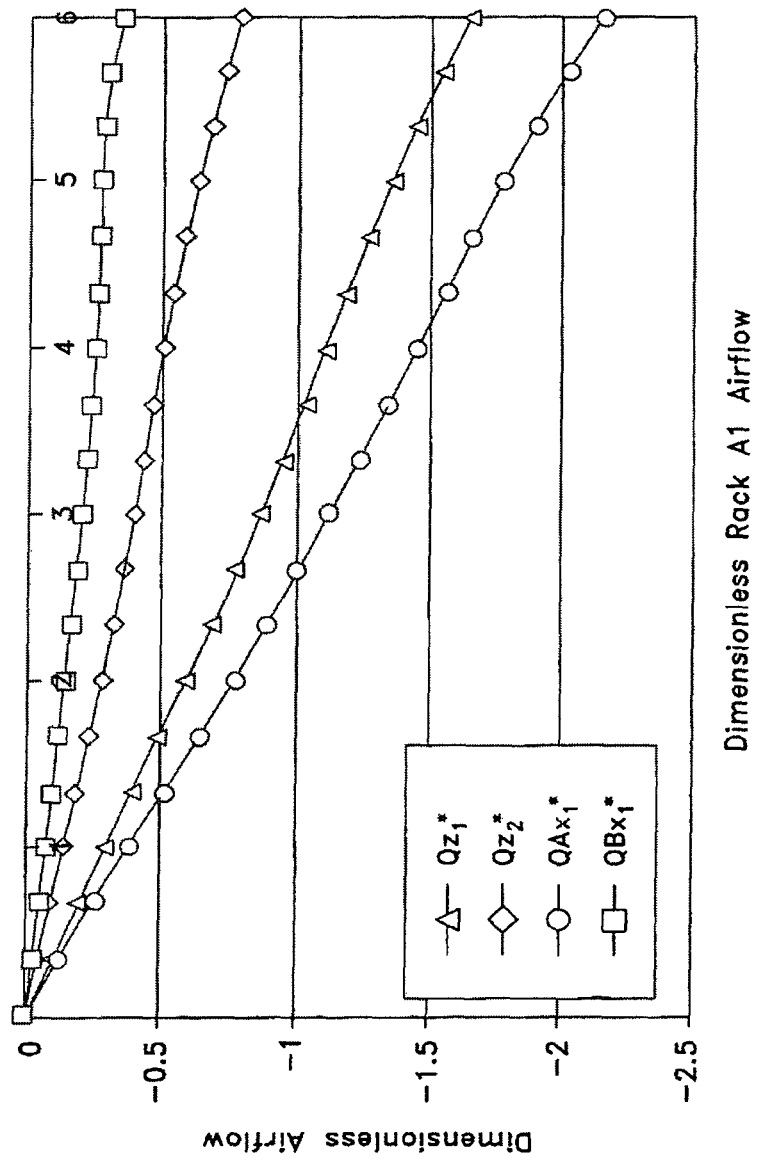
FIG. 12 is a graph used in determining airflows in one embodiment.

As an example, internal horizontal airflows associated with boundary condition Rack A1 for an n=2 cluster are shown in FIG. 12. There are 4 curves in FIG. 12 because there are 4 horizontal internal airflows associated with an n=2 cluster of racks. All of these curves can be conveniently approximated with a least-squares fit to a cubic polynomial of the generic form $$Q^* = c_1(QRA_1^*) + c_2(QRA_1^*)^2 + c_3(QRA_1^*)^3 \quad (8)$$

so that only the coefficients $c_1$, $c_2$, and $c_3$ must be stored for all airflows associated with all unique boundary conditions for all n's. Storing the "response" airflow as an equation offers the additional benefit compared to a simple look-up table in that results outside the domain of FIG. 12 are automatically interpolated.

The process involved in compiling the curves in FIG. 12 and the constants of Equation 8 is repeated for all unique boundary conditions for all n's considered. Determining all internal airflow correlations, for example, up to n=30 requires several hundreds of CFD runs. Therefore, in at least one embodiment, the process of converting the raw CFD data into the curve-fit constants of Equation 8 is automated. In at least some examples above, the flow in the cold aisle is considered to be ideal with no viscosity or turbulence. To verify this assumption, sample CFD cases were run with turbulence and viscosity included, and little difference was detected between models that included viscosity and turbulence and those that did not.

The discussion above describes a process for all internal cold-aisle airflows for any row length, perforated tile airflow, and rack airflow distribution assuming that that the end airflow is known. A process for predicting the end airflow will now be described.

Unlike the airflow within the cold aisle, the end airflow is strongly coupled to the airflow in the surrounding room environment. Buoyancy forces can be significant; direct superposition of rack-induced airflows may not work well and the end airflows do not depend simply on the dimensionless rack airflow rates. The end airflow can still be determined using empirical correlations of CFD data; however, a relatively large number of CFD simulations typically should be performed in order to achieve reasonable accuracy over a useful range of actual layouts. A comprehensive model for end airflow, which takes into account different geometric and thermal environments, may be included in other embodiments. In one embodiment, described herein, a method includes predicting end airflow as a function of rack power and airflow distribution for any row length and perforated tile flow rate while assuming a fixed room environment. The example environment is large and free of other racks or objects. Air is supplied at 60° F. and is exhausted uniformly over a 14 ft-high ceiling. As discussed above, under ideal-flow conditions, we can expect air velocity at points near the racks to scale with the dimensionless rack inlet velocities. Further, as discussed above these "response" velocities vary nearly linearly with dimensionless rack flow rate (or velocity). It is, therefore, reasonable to estimate the dimensionless end airflows based on the following expression:

$$QAx_0^* = a_0 + a_{A1}QRA_1^* + a_{A2}QRA_2^* + \ldots + a_{An}QRA_n^* + a_{B1}QRB_1^* + a_{B2}QRB_2^* + \ldots + a_{Bn}QRB_n^* \quad (9)$$

where $QAx_0^*$ is one of four dimensionless end airflows for a cluster and the coefficients $a_{Ai}$ and $a_{Bi}$ effectively weight the relative importance of each rack on the end airflow. The weighting coefficients associated with racks located near the end of the row will be much larger than those associated with more interior racks. Further, empirically it is found that only racks in the first four or five positions nearest the end of the row need be retained in Equation 9. For the fixed conditions considered, the constant $a_0$ is negative, implying that the flow is "out" (driven by buoyancy) when there is zero rack airflow.

To determine the values of the coefficients in Equation 9 for a particular set of room environment and cluster geometry, many (on the order of 100) CFD simulations may be performed at a number of different perforated tile flow rates. A large pool of rack power values may be created from which the many CFD simulations draw rack power and airflow data from, either randomly or systematically. The rack power values may be based on the frequency distribution of actual data center racks as determined from a survey. The rack power and airflow values used in the CFD simulations may be scaled as necessary to achieve practical total supply-to-equipment airflow ratios in the range of, for example, 0.9 to 3 for each perforated tile flow rate considered. The CFD data is then used to determine a least-squares fit of the coefficients in Equation 9 for each tile flow rate considered.

In summary, a simple end airflow model has been described which accurately accounts for a non-uniform distribution of rack airflow and power for a fixed set of room conditions. In at least one embodiment, the model is generalized to include the effects of geometric environment, the thermal environment, and supply airflow rate. The effects of the end airflow penetrate only a few rack distances down the row; for longer row lengths predictions for the majority of the racks in the cluster will be good even if the end airflow model is not as accurate as desired.

Figure 13:
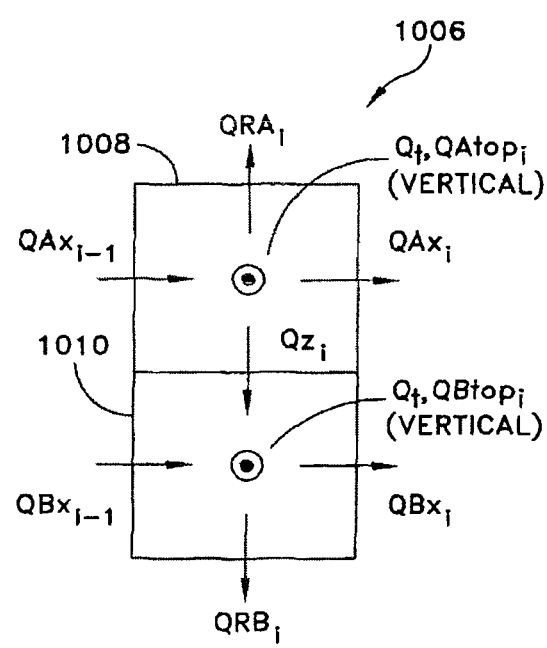
FIG. 13 is a diagram identifying airflows used with one analysis method of one embodiment.

The airflow into or out of the top of each control volume has been left "floating" as necessary degrees of freedom in the above example. Now, with all of the horizontal airflows computed as discussed above, the airflow at the top of each control volume is computed based on the conservation of mass. With reference to FIG. 13, using dimensional quantities, the equations for A-row and B-row control volumes are determined using equations 9(a) and 9(b).

$$QA\text{top}_i = Q_T - QRA_i + QAx_{i-1} - Qz_i - QAx_i \quad (10a)$$

$$QB\text{top}_i = Q_T - QRB_i + QBx_{i-1} + Qz_i - QBx_i \quad (10b)$$

Applied to all control volumes, equations 9a and 9b represent a total of 2n equations. At this stage, there is only one unknown per equation ($QA\text{top}_i$ and $QB\text{top}_i$) so they may be solved sequentially.

At this point, all airflows within the cold aisle are known for the example. What remains is to track the airflow into each rack so that its origin may be identified and the recirculation index (RI) can be calculated for each rack. As discussed above, RI is the fraction of recirculated air ingested by a rack. The recirculated air can enter the cold aisle at any point where there is inflow at the ends of the rows or along the top of the cold aisle. Further, the warm recirculated air need not directly enter the cold aisle via the control volume immediately adjacent to a rack of interest; it may enter anywhere, travel anywhere the airflow patterns take it, and end up at the inlet of any rack.

To compute RI for each rack the cool supply air is distinguished from the warm recirculated air at all points in the cold aisle. Mathematically, this is accomplished by defining the concentration of recirculated air at any point in the cold aisle using Equation 11.

$$C_{recirc} = (\text{mass of recirculated air})/(\text{total mass of air}) \quad (11)$$

It follows from Equation 11 that the supply airflow emerging from the tiles has a $C_{recirc} = 0$ and that anywhere the recirculated air enters the cold aisle along the sides or top of the cold aisle and $C_{recirc}$ may be set equal to 1. In practice, $C_{recirc}$ may be set to a value less than 1 for the ends of the cold aisle recognizing that, on average, the top is generally much warmer than the ends of the cold aisle. Accordingly, in one embodiment, $C_{recirc} = 0.5$ for any inflow at the ends of the cold aisle.

The recirculated air can be assumed to have the same physical properties as the cool supply air so that it has no effect, e.g. due to a density difference, on the airflow patterns in the cold aisle.

Now consider a small volume just covering a rack inlet. Equation 11 applied to this volume represents the average $C_{recirc}$ over this volume. Dividing the numerator and denominator by a small time increment $\Delta t$ and taking the limit as $\Delta t \to 0$, demonstrates that the average $C_{recirc}$ over a rack inlet is precisely the rack recirculation index. Thus, to determine the RR's for each rack the average $C_{recirc}$ over each rack inlet is determined. Referring back to FIG. 8, we can estimate the RR for each rack as the average $C_{recirc}$ of the control volume immediately adjacent to the rack of interest. $C_{recirc}$ over all 2n control volumes can be computed from the conservation of mass of the recirculated air using Equation 12.

$$\sum_{\substack{\text{All CV} \\ \text{Faces}}} C_{recirc} Q = 0 \quad (12)$$

where Q is the total airflow rate through each control volume face and is a known value at this stage of the calculation.

FIG. 13, shows control volumes 1008 and 1010 of a transverse section of a cold aisle 1006. Equation 12 is applied to the control volumes 1008 and 1010. For convenience, we label the $C_{recirc}$ crossing each control volume surface with same convention used for airflows while dropping the "recirc" subscript. The result is $$C_T Q_T + (CAx_{i-1})(QAx_{i-1}) = (CRA_i)(QRA_i) + (CAx_i)(QAx_i) + (Cz_i)(Qz_i) + (CA\text{top}_i)(QA\text{top}_i) \quad (13a)$$

$$C_T Q_T + (CBx_{i-1})(QBx_{i-1}) + (Cz_i)(Qz_i) = (CRB_i)(QRK_i) + (CBx_i)(QBx_i) + (CB\text{top}_i)(QB\text{top}_i) \quad (13b)$$

Equations 13a and 13b are not solved directly because the number of $C_{recirc}$ values exceeds the number of equations. Estimating each $C_{recirc}$ as the average $C_{recirc}$ from the "upwind" control volume, results in a proper balance of 2n unknown $C_{recirc}$'s and 2n equations. Based on this "upwind" approach, the appropriate $C_{recirc}$ values are inserted into Equations 13a and 13b after the airflow patterns in the cold aisle have been computed thereby establishing the direction of airflow crossing each face of each control volume.

TABLE 4

$C_{recirc}$ Settings Based on Airflow Direction

| | Upwind Value of $C_{recirc}$ | |
|---|---|---|
| Airflow | Airflow ≥ 0 | Airflow < 0 |
| $Q_t$ | 0 | 0 |
| $QAx_i$ | $CA_i$ | $CA_{i+1}$ |
| $QBx_i$ | $CB_i$ | $CB_{i+1}$ |
| $Qz_i$ | $CA_i$ | $CB_i$ |
| $QA\text{top}_i$ | $CA_i$ | 1 |
| $QB\text{top}_i$ | $CB_i$ | 1 |

Table 4 shows the appropriate upwind values of $C_{recirc}$ to be used in Equations 13a and 13b where the $CA_i$ and $CB_i$ are the average $C_{recirc}$ over the relevant "A" or "B" control volumes respectively. Not shown in the table are the settings for $QAx_i$ and $QBx_i$ at the end of the row, i.e. $Qax_0$, $QBx_0$, $QAx_n$, and $QBx_n$. In this case $C_{recirc}$ may be set to 0.5 as discussed above for any "inflow".

With the values of $C_{recirc}$ taken from Table 4, the 2n Equations represented by 13a and 13b may be solved simultaneously for the 2n $CA_i$ and $CB_i$ values. These simple linear equations can be solved without iteration virtually instantaneously for any practical row length using common computing hardware. Finally, as discussed above, the computed $CA_i$ and $CB_i$ values may be directly interpreted as the recirculation index of the adjacent "A" and "B" racks respectively.

In other embodiments, because of the similarity between the energy and concentration equations, bulk average temperature could be determined over each control volume instead of RI following a very similar procedure.

Figure 14:
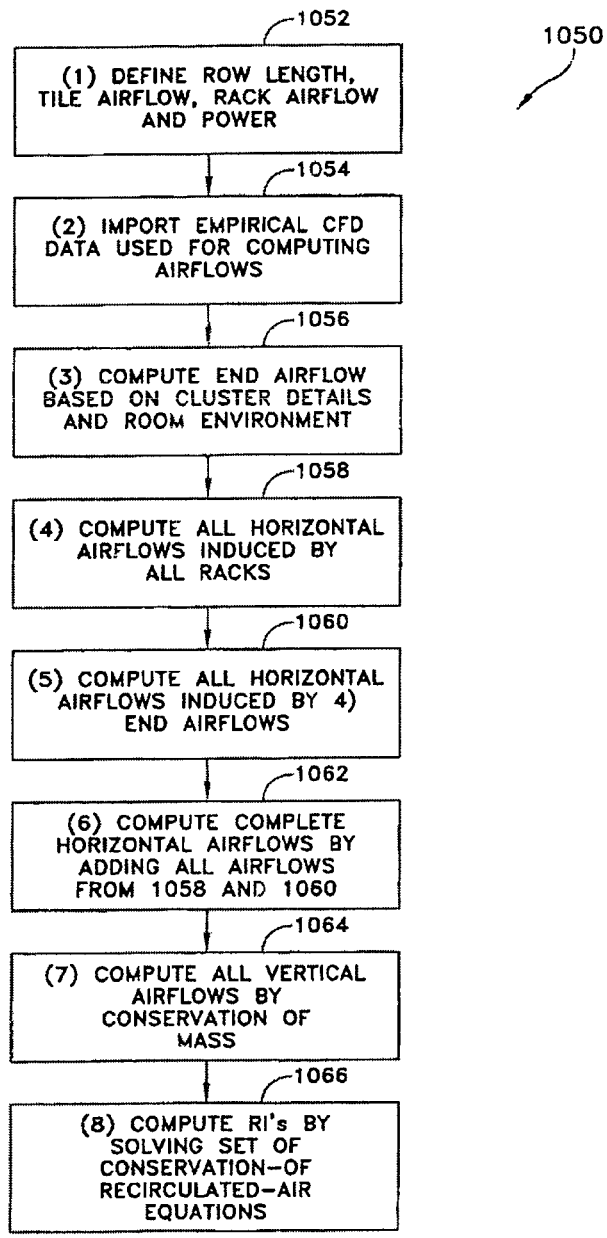
FIG. 14 is a flow chart of a process for determining a recirculation index in one embodiment.

A summary of a process 1050 for determining recirculation index for a cluster of racks using the methodology described above will now be provided with reference to FIG. 14. In a first stage 1052 of the process, the row length, tile airflow, rack airflow and rack power are defined for a cold aisle to be analyzed. Next, in stage 1054, empirical data used for computing airflows is imported from a CFD analysis as described above. The end airflows are then determined at stage 1056 based on details of the cluster and details of the room environment. All horizontal airflows are then determined at stage 1058. At stage 1060, horizontal airflows induced by the 4 end airflows are computed, and at stage 1062, complete horizontal airflows are computed by adding the airflows from stages 1058 and 1060. Vertical airflows are computed at stage 1064, and then at stage 1066, the recirculation index may be determined for each rack by solving a set of conservation equations for the recirculated air as described above.

In one embodiment, to determine cooling capacity for a given rack based on the recirculation index, a threshold recirculation index is first established, below which a design is considered unsatisfactory. For each rack, after a satisfactory design is achieved, the power of the rack is increased until the recirculation index of the that rack (or any other rack) reaches the threshold level, and the power at which that occurs represents the maximum cooling capacity for the rack. A similar method for determining cooling capacity can be used with other analyses described herein, including the analysis using capture index values described below.

In other embodiments, the control volume and superposition methods described above may be modified. These modifications may include the use of more complex statistical methods (e.g., the use of neural networks) to determine end airflow conditions from large pools of CFD data. Further, the number of control volumes may be substantially increased to improve accuracy and resolution of computed variables. In particular, the latter improvement would allow airflow variations at various rack elevations (e.g., due to a variety of equipment installed in a rack) to be considered. The basic methodology could further be modified to include layouts beyond the scope discussed above including layouts involving an arbitrary number of perforated tiles of arbitrary flow rate, an arbitrary cold aisle width, arbitrary rack dimensions or other such variations from examples discussed above.

In processes described above, cooling analyses of a data center have focused primarily on determining airflows in the cool aisle for a cluster of racks located in a data center having a raised floor. Embodiments described above, however, are not limited for use in data centers having raised floors, and aspects of the embodiments are also applicable to data centers that do not include raised floor cooling systems. At least one embodiment described above provides a decoupling of the cold aisle from the remainder of the data center to compute airflows in the cold aisle. The effect of the room environment is then built back into the analysis using end-of-row airflows that are computed, for example, in separate CFD calculations that may be computed offline and made available through look-up tables or empirical correlations. As described below, in a similar manner to that described above, a hot aisle in a data center can be analyzed by decoupling the aisle from the remainder of the room and later building the effects of the room environment back into the analysis.

In additional embodiments that will now be described, processes are provided for evaluating a cluster of racks based on airflows that occur in a hot aisle for a cluster of racks. In at least one version of the additional embodiments, a raised floor data center is not used, but rather, cooling is provided using in-row cooling units as described above. In one particular process of one embodiment, a capture index (CI) is calculated and used to analyze a cluster of racks in a data center. The capture index is used in one embodiment with a row or cluster of racks having one or more in-row cooling units, and the capture index is defined as the percentage of air released by a rack into a hot aisle, which is captured by cooling units bounding the hot aisle. The CI may be considered as a complementary metric to the RI described above for use with the hot aisle. The CI is useful when the focus of a design is to keep the hot air within the hot aisle. As discussed above, rack inlet temperatures are typically the ultimate cooling metric, however, if all of the hot air is captured in the hot aisle, the rest of the data center (including rack inlets) can be designed and controlled to remain at "room temperature."

In one embodiment, the use of chemical concentrations with, for example a CFD analysis, can be used to quantitatively determine CI. The exhaust of each rack is identified in such an analysis as a separate species having the same properties as air, so as not to change the physics of airflow. The fraction of hot air released from rack, (identified as $C^i$) which is captured by an in-row cooler identified as cooler$_j$ may be computed using Equation 14 below.

$$f_{ij} = C_j^i (Q_{coolerj})/Q_{racki} \quad (14)$$

where:
$C_{ji}$ is the concentration of $C^i$ at the inlet of cooler j
$Q_{coolerj}$ is the airflow rate (e.g. in cfm) through coolerj
$Q_{racki}$ if the airflow rate (e.g. in cfm) through racki As an example, if the cooler and rack airflow are equal, and the concentration of exhaust air $C^i$ from rack i at the cooler inlet is measured to be 0.5, then this implies that half of the exhaust air from rack i is captured by cooler j. In a hot aisle having N coolers, then the capture index (CI) is the sum of all of the $f_{ij}$'s over all N coolers and can be expressed using Equation 15 below.

$$CI_i = \sum_{j=1}^{N} C_j^i \frac{Q_{coolerj}}{Q_{racki}} \quad (15)$$

Figure 15:
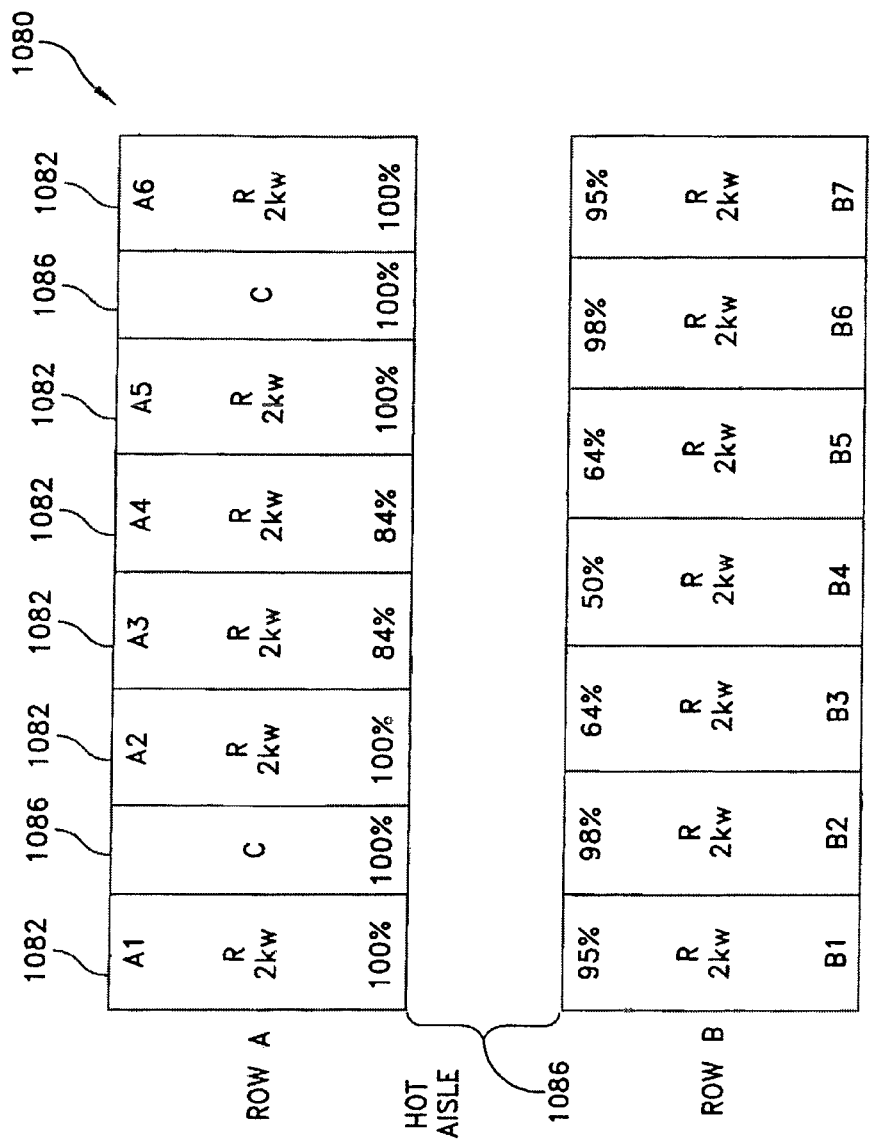
FIG. 15 is a schematic diagram showing a layout of equipment racks used in an analysis in one embodiment to determine a capture index.

As will now be described, with reference to FIG. 15, which shows a cluster of racks 1080, a set of empirical rules can be used to determine the CI for each rack 1082 of the cluster. As shown in FIG. 15, the resulting CI values may be displayed on a display with the associated racks. In one example, racks having a CI less than 60% are identified in red indicating a warning, racks having a CI between 60% and 80% are indicated in yellow as a caution, and racks having a CI greater than 80% are indicated in green indicating that the CI is satisfactory.

In one embodiment, a large pool of CFD runs can be performed to establish and refine empirical rules. In other embodiments, neural networks and other techniques may be used to refine rules. The cluster 1080 includes two rows (row A and row B) of parallel racks, that exhaust air to a common hot aisle 1084. Each Rack is labeled A1-A6 and B1-B7, identifying the row and position in the row of the rack, and for the example shown each rack has a power draw of 2 kW. The cluster also includes in-row cooling units 1086. In FIG. 15, a number of half-rack cooling units 1086 are shown, but embodiments of the invention may also be used with full-width rack cooling units or other devices. The half-rack cooling units used in the example associated with FIG. 15 have a nominal cooling capacity of 17 kW. Also shown in FIG. 15 is the CI in terms of percentage for each rack. The CI is shown as a percentage and indicates for each rack, the percentage of its exhaust air that is captured by one of the cooling units.

The CI is determined based on the concept that all rack-cooling unit interactions depend only on the magnitude of airflow associated with the racks and cooling units and their relative geometric positions. Each rack location can be thought of as having a certain potential to supply airflow to other rack locations. This potential varies inversely with the distance of separation. For example, rack A1 in FIG. 15 could potentially supply a large portion of its airflow to the area near rack A2. However, much less of rack A1's airflow could make its way to position A6. Further, the amount of airflow a rack can supply to other locations is in direct proportion to its own total airflow. The net airflow which can be supplied to a particular rack location A1 can be represented using Equation 16 below.

$$(Q_{Ai})_{net} = (Q_{Ai})_{self} + \sum_{\text{all other racks } j} (Q_{Aj})_{self} A e^{-B\Delta x} + c\left\{(Q_{Bi})_{self} + \sum_{\text{all other racks } j} (Q_{Bj})_{self} A e^{-B\Delta x}\right\} \quad (16)$$

where
($Q_{Ai}$)$_{net}$=The net maximum airflow that can be supplied to location Ai including contributions from all other racks.
($Q_{Ai}$)$_{self}$=The actual airflow supplied by the rack at location Ai.
A=empirical constant.
B=empirical constant.
C=empirical "coupling" constant for accounting for effects from opposite row.

The net maximum airflow that can be supplied to various locations in the B row is computed using a similar expression. Finally, the same expression is used to compute the net maximum airflow, which can be captured at any rack location—with the sum over all cooler instead of racks. The CI is then estimated as the ratio of net airflow captured and net airflow supplied at any location expressed as a percentage and with values capped at 100%. The constants A, B, and C are selected to provide the best statistical fit to benchmark CFD data. Different values of the constants may be used to account for alternative configurations including different cooler types, different average rack power or peak-to-average power ratios and alternative hot-aisle spacing, row lengths, or room environments. As an example, consider a cluster of average power racks with modest rack-to-rack power variations. The cluster is 14 ft. long, contains a 3 ft. wide hot aisle, and is assumed to be in a fairly tightly packed data center environment with a 12 ft. ceiling height. In this case, reasonable predictions are made with the empirical constants taken as A=0.56, B=0.33, and C=0.65.

In the embodiment described above, the CI is calculated for a cluster of racks having uniform depth and width. In other embodiments, the same processes may be used for racks of non-uniform depth and width. In one embodiment, the CI calculations described above are programmed into a Microsoft Excel Spreadsheet program that allows a user to add and move cooling units to see the effect of different numbers of cooling units and their placements. In other embodiments, the process for determining CI described above may be incorporated into data center design and management systems, such as system 200 discussed above.

In the embodiment above, an exponential expression is used for modeling the rack and cooler interactions. In other embodiments, other expressions may be used, such as a polynomial or any other mathematical expression which contains a number of parameters which may be tuned to provide the best fit to benchmark performance data. Further, different curves and/or different coefficients may be used for the portion of the calculation associated with determining air supplied by racks than used in the portion of the calculation used for determining air captured by cooling units. In another embodiment, the rules may be further refined to address specific situations. For example, a Rack A may have no effect on another Rack B where a third rack C is located between Rack A and Rack B and has greater airflow than either Rack A or Rack B.

In still another embodiment, the effects of the ends of rows may be accounted for explicitly. Separate CFD simulations may be conducted to determine the net inflow or outflow of air at each end of a row for given layouts of racks and cooling units. The results of the CFD simulations may be incorporated into the empirical methods described above to determine CI for racks in a cluster. The results of the CFD simulations can be used to provide correct airflow estimates at the ends of the row, while one of the algorithms discussed above may be used to determine CI at more interior portions of the row. Similarly, the effects of a missing rack or racks may be simulated using CFD with the results incorporated into the empirical methods.

The capture index method of analysis discussed above provides a rack-by-rack, or local, cooling performance metric for equipment racks in a data center. In addition to using CI as a rack-level metric in a hot aisle analysis, in another embodiment, cluster-wide performance metrics are determined, and the overall cooling performance of the cluster may be determined based on both the CI metric and the global metric. The cluster-wide performance metrics indicate whether the cluster as a whole will have adequate cooling performance. The CI identifies which racks are not having their exhaust airflow adequately captured. If a rack having a low CI is a low power rack, this may not result in a problem. Furthermore, a rack may have a relatively high CI, yet still cause problems if it is a high power rack with a high outlet temperature. In one embodiment, the global metric that is used is a determination of the net power which escapes the hot aisle. The net escaped power can be determined using equation 17.

$$\sum_{\text{all racks } i} (1 - CI_i) P_i \quad (17)$$

where,
$CI_i$=the capture index for rack i expressed as a fraction (rather than percentage), and
$P_i$=the power of rack i.

The net escaped power determined by equation 17 may be correlated to maximum cluster inlet temperatures (e.g., a net escaped power of 25 kW may imply a maximum cluster rack inlet temperature of seventy-nine degrees F.) for clusters of particular geometric layouts (e.g., hot aisle width, row length, etc.), room environments and rack and cooler details (e.g., cooling unit flow rate and rack airflow/power (cfm/kW)). Accordingly, the net escaped power may be used to determine the highest rack inlet temperature.

Figure 16:
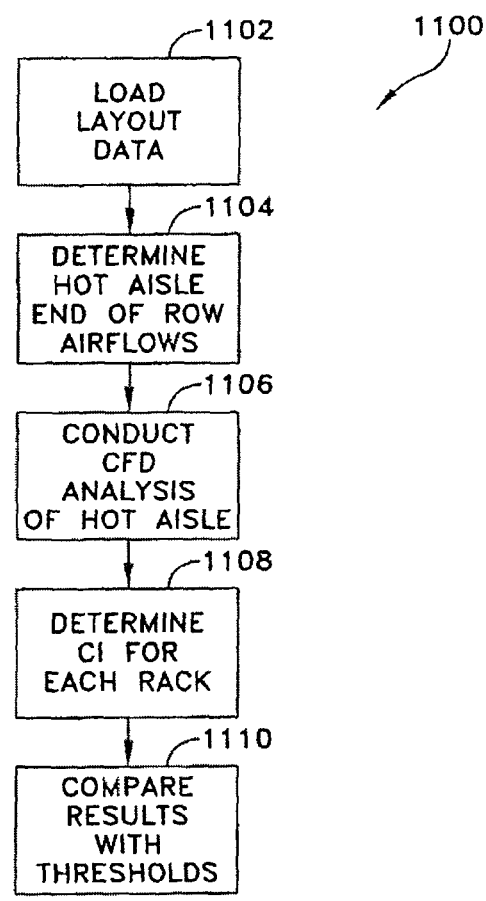
FIG. 16 is a flowchart of a process for determining a capture index in accordance with one embodiment.

In other embodiments, other techniques described above for calculating airflows in a cool aisle may be applied to a hot aisle analysis to determine CI, including the use of CFD, CGCFD and control volumes. The use of superposition may be less applicable in hot aisle analyses because the airflow patterns are not ideal. In still another embodiment, a process 1100 is provided for determining CI in a hot aisle using a CFD analysis. The CFD analysis is performed only on the hot aisle itself and end of row airflows are determined separately and may be patched into the CFD solution. Common computer hardware can be used to conduct such a CFD analysis in 10 to 20 seconds. The process 1100 is shown in flowchart form in FIG. 16. In a first stage 1102 of the process 1100 data related to the layout is loaded either manually, read from a database, or in any other manner. The data related to the layout may include row length, power draw and airflow for each rack, rack dimensions, cooling unit types, locations and flow rates, hot aisle widths and room environment details (i.e., size, temperatures).

At stage 1104 of the process 1100, hot-aisle end of row airflows are determined using best-fit curves, or look-up tables based on prior CFD studies. Hot aisle end of row calculations may be performed using the same techniques used to determine cold aisle end of row airflows with the input rack airflow provided as a positive value and the cooling units airflow input as a negative value. At stage 1106, a CFD analysis of just the hot aisle is performed using results of the end airflow analysis of stage 1104 and with the top of the hot aisle taken as a constant-pressure boundary. In the analysis, the exhaust air for each rack is "tagged" with a particular concentration. At stage 1108, the CI for each rack is determined based on the ratio of captured and supplied airflows computed by equation 16 and the results of stage 1106. The global cluster cooling metric may also be determined at this point using equation 17. At stage 1110, the rack CI's and the global cluster cooling metric can be used to determine if cooling for the cluster is adequate.

In addition to the cooling analysis methods discussed above, which provide real-time analysis of data centers, additional cooling analysis methods may be used in embodiments of the invention. These additional methods include a panel method, a potential analysis method, flow network/zonal modeling, principal component analysis or a combination of any of these and the methods discussed above. These additional cooling analysis methods are generally known to those of skill in the art.

Various embodiments according to the invention may be implemented on one or more computer systems as discussed above. For example, system 200 may be implemented in a single computer system or in multiple computer systems. These computer systems may be, for example, general-purpose computers such as those based on Intel PENTIUM-type processor, Motorola PowerPC, Sun UltraSPARC, Hewlett-Packard PA-RISC processors, or any other type of processor.

Figure 17:
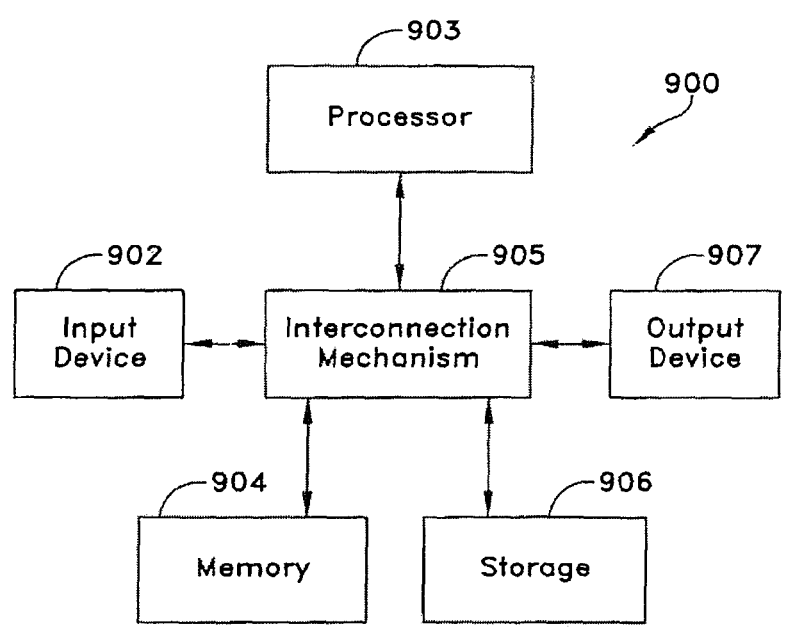
FIG. 17 is a functional block diagram of a computer system that may be used in embodiments of the invention.

For example, various aspects of the invention may be implemented as specialized software executing in a general-purpose computer system 900 such as that shown in FIG. 17. The computer system 900 may include a processor 903 connected to one or more memory devices 904, such as a disk drive, memory, or other device for storing data. Memory 904 is typically used for storing programs and data during operation of the computer system 900. The computer system 900 may also include a storage system 906 that provides additional storage capacity. Components of computer system 900 may be coupled by an interconnection mechanism 905, which may include one or more busses (e.g., between components that are integrated within a same machine) and/or a network (e.g., between components that reside on separate discrete machines). The interconnection mechanism 905 enables communications (e.g., data, instructions) to be exchanged between system components of system 900.

Computer system 900 also includes one or more input devices 902, for example, a keyboard, mouse, trackball, microphone, touch screen, and one or more output devices 907, for example, a printing device, display screen, speaker. In addition, computer system 900 may contain one or more interfaces (not shown) that connect computer system 900 to a communication network (in addition or as an alternative to the interconnection mechanism 905).

Figure 18:
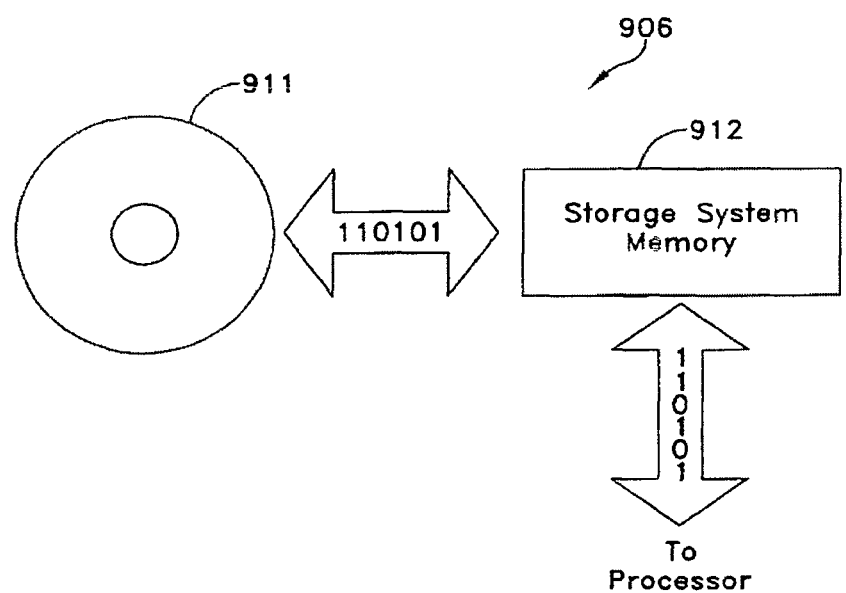
FIG. 18 is a functional block diagram of a storage system that may be used with the computer system of FIG. 17.

The storage system 906, shown in greater detail in FIG. 18, typically includes a computer readable and writeable nonvolatile recording medium 911 in which signals are stored that define a program to be executed by the processor or information stored on or in the medium 911 to be processed by the program to perform one or more functions associated with embodiments described herein. The medium may, for example, be a disk or flash memory. Typically, in operation, the processor causes data to be read from the nonvolatile recording medium 911 into another memory 912 that allows for faster access to the information by the processor than does the medium 911. This memory 912 is typically a volatile, random access memory such as a dynamic random access memory (DRAM) or static memory (SRAM). It may be located in storage system 906, as shown, or in memory system 904. The processor 903 generally manipulates the data within the integrated circuit memory 904, 912 and then copies the data to the medium 911 after processing is completed. A variety of mechanisms are known for managing data movement between the medium 911 and the integrated circuit memory element 904, 912, and the invention is not limited thereto. The invention is not limited to a particular memory system 904 or storage system 906.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 900 is shown by way of example as one type of computer system upon which various aspects of the invention may be practiced, it should be appreciated that aspects of the invention are not limited to being implemented on the computer system as shown in FIG. 17. Various aspects of the invention may be practiced on one or more computers having a different architecture or components shown in FIG. 17. Further, where functions or processes of embodiments of the invention are described herein (or in the claims) as being performed on a processor or controller, such description is intended to include systems that use more than one processor or controller to perform the functions.

Computer system 900 may be a general-purpose computer system that is programmable using a high-level computer programming language. Computer system 900 may be also implemented using specially programmed, special purpose hardware. In computer system 900, processor 903 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that embodiments of the invention are not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that performs build-out functions may be located remotely from a system manager. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). For example, one or more database servers may be used to store device data that is used in designing layouts, and one or more servers may be used to efficiently perform cooling calculations associated with embodiments of the present invention.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

In embodiments of the invention discussed above, systems and methods are described that provide indications of remaining cooling capacity for equipment enclosures. The indication of remaining cooling capacity may be a direct indication of remaining cooling in terms of, for example, kilowatts or BTU per hour, or the indication may be indirect such as providing the total capacity of cooling available to an enclosure along with an indication of how much cooling is being used, for example, in terms of percentage. Further, calculated values, including the capture index and the recirculation index may be used to determine the sufficiency of a particular design and to determine additional cooling capacity before a warning or error condition will result.

Embodiments of a systems and methods described above are generally described for use in relatively large data centers having numerous equipment racks, however, embodiments of the invention may also be used with smaller data centers and with facilities other than data centers. Further, as discussed above, embodiments of the present invention may be used with facilities having raised floors as well as with facilities that do not have a raised floor.

In embodiments of the present invention discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for evaluating cooling performance of a cluster of equipment racks in a data center, wherein the cluster of equipment racks includes at least a first row of racks and a second row of racks separated by a cool aisle, with each of the equipment racks being configured to draw cooling air from the cool aisle, the method comprising:
obtaining cool airflow data for cooling air supplied to the cool aisle from an in-row cooling unit included in the cluster of racks;
conducting an analysis of airflows in the cool aisle including:
determining first airflow values into a front face of each of the equipment racks from the cool aisle, and
determining second airflow values into and out of each end of the cool aisle;
determining, by the computer system, a recirculation index for at least one equipment rack using the first airflow values and the second airflow values; and
determining a cooling capacity for the at least one equipment rack using the recirculation index.

2. The method of claim 1, wherein the recirculation index is equal to a ratio of recirculated air to total air in an input airflow of the at least one equipment rack.

3. The method of claim 1, further comprising displaying, via a display of the computer system, at least one of the recirculation index and the cooling capacity for the at least one the equipment rack.

4. The method of claim 1, further comprising defining a plurality of control volumes in the cool aisle.

5. The method of claim 4, wherein conducting the analysis of airflow values further comprises determining airflow values in and out of each of the plurality of control volumes.

6. The method of claim 1, further comprising importing empirical data and determining at least one of the first airflow values and the second airflow values using the empirical data.

7. The method of claim 1, wherein determining the recirculation index further comprises obtaining airflow values of at least one perforated tile included in the cool aisle.

8. The method of claim 1, wherein determining the cooling capacity for the at least one equipment rack further comprises:
- establishing a threshold value for a recirculation index of the at least one equipment rack;
- establishing a power value supplied to the at least one equipment rack;
- calculating, based on the power value, a new value for the recirculation index of the at least one equipment rack; and
- determining a comparison result indicating whether the new value transgresses the threshold value.

9. The method of claim 5, further comprising defining a first control volume at an elevation different from a second control volume, the first and second control volumes included in the plurality of control volumes.

10. The method of claim 1, further comprising using the recirculation index to detect hotspots in the data center.

11. A system for evaluating cooling performance of a cluster of equipment racks in a data center, wherein the cluster of equipment racks includes at least a first row of racks and a second row of racks separated by a cool aisle, with each of the equipment racks being configured to draw cooling air from the cool aisle, the system comprising:
- at least one input to receive data related to equipment and data related to cooling characteristics of the data center;
- a controller operatively coupled to the at least one input and configured to:
  - conduct an analysis of airflows in the cool aisle including determining first airflow values into a front face of each of the equipment racks from the cool aisle, and determining second airflow values into and out of each end of the cool aisle,
  - determine a recirculation index for at least one equipment rack using the first airflow values and the second airflow values, and
  - determine a cooling capacity for the at least one equipment rack using the recirculation index; and
- at least one display operatively coupled to the controller that displays at least one of the recirculation index and the cooling capacity for the at least one the equipment rack.

12. The system of claim 11, wherein the controller is further configured to determine the recirculation index as equal to a ratio of recirculated air to total air in an input airflow of the at least one equipment rack.

13. The system of claim 11, wherein the at least one input is further configured to receive cool airflow data for cooling air supplied to the cool aisle from an in-row cooling unit included in the cluster of racks.

14. The system of claim 11, wherein the controller is further configured to define a plurality of control volumes in the cool aisle.

15. The system of claim 14, wherein the controller is further configured to conduct the analysis of airflow values in the cool aisle by determining airflow values into and out of each of the plurality of control volumes.

16. The system of claim 11, wherein the at least one input is further configured to receive airflow values of at least one perforated tile included in the cool aisle.

17. The system of claim 11, wherein the controller is further configured to determine the cooling capacity by:
- establishing a threshold value for a recirculation index of the at least one equipment rack;
- establishing a power value supplied to the at least one equipment rack;
- calculating, based on the power value, a new value for the recirculation index of the at least one equipment rack; and
- determining a comparison result indicating whether the new value transgresses the threshold value.

18. The system of claim 15, wherein the controller is further configured to define a first control volume at an elevation different from a second control volume, the first and second control volumes included in the plurality of control volumes.

19. The system of claim 11, wherein the controller is further configured to use the recirculation index to detect hotspots in the data center.

20. A computer-readable non-transitory medium encoded with instructions for execution on a computer system, the instructions when executed, performing a method comprising acts of:
- obtaining cool airflow data for cooling air supplied to the cool aisle from an in-row cooling unit included in the cluster of racks;
- conducting an analysis of airflows in a cool aisle for a plurality of equipment racks arranged in a cluster, wherein the cluster of equipment racks includes at least a first row of racks and a second row of racks separated by the cool aisle, with each of the equipment racks being configured to draw cooling air from the cool aisle, including:
  - determining first airflow values into a front face of each of the equipment racks from the cool aisle, and
  - determining second airflow values into and out of each end of the cool aisle;
- determining a recirculation index for at least one equipment rack using the first airflow values and the second airflow values; and
- determining a cooling capacity for the at least one equipment rack using the recirculation index.

21. The computer-readable non-transitory medium of claim 20, wherein the method comprises act of displaying at least one of the recirculation index and the cooling capacity for the at least one the equipment rack.

* * * * *